(12) United States Patent
Galicia Rodríguez

(10) Patent No.: US 10,814,831 B2
(45) Date of Patent: Oct. 27, 2020

(54) ALARM SYSTEM FOR A VEHICLE INTEGRATING WIRELESS COMMUNICATION DEVICES AND MOBILE DEVICES ASSOCIATED WITH SAID SYSTEM

(71) Applicant: Josué Galicia Rodríguez, Coacalco de Berriozabal (MX)

(72) Inventor: Josué Galicia Rodríguez, Coacalco de Berriozabal (MX)

( * ) Notice: Subject to any disclaimer, the term of this patent is extended or adjusted under 35 U.S.C. 154(b) by 0 days.

(21) Appl. No.: 16/331,343

(22) PCT Filed: Aug. 24, 2017

(86) PCT No.: PCT/IB2017/055095
§ 371 (c)(1),
(2) Date: Mar. 7, 2019

(87) PCT Pub. No.: WO2018/051201
PCT Pub. Date: Mar. 22, 2018

(65) Prior Publication Data
US 2019/0359172 A1    Nov. 28, 2019

(30) Foreign Application Priority Data
Sep. 15, 2016 (MX) ............ a/2016/012080

(51) Int. Cl.
*B60R 25/102* (2013.01)
*H04W 4/48* (2018.01)
*B60R 25/32* (2013.01)
*B60R 25/33* (2013.01)
*B60R 25/40* (2013.01)
*G06F 3/0481* (2013.01)

(52) U.S. Cl.
CPC ............ *B60R 25/102* (2013.01); *B60R 25/32* (2013.01); *B60R 25/33* (2013.01); *B60R 25/403* (2013.01); *H04W 4/48* (2018.02); *G06F 3/04817* (2013.01)

(58) Field of Classification Search
CPC .................................................. B60R 25/102
See application file for complete search history.

(56) References Cited

U.S. PATENT DOCUMENTS 6,542,072 B1    4/2003  Yang
9,919,682 B2 *  3/2018  Flick ...................... B60R 25/30
(Continued)

FOREIGN PATENT DOCUMENTS

CN    102390351 A    3/2012
CN    202806683 U    3/2013
(Continued)

Primary Examiner — Qutbuddin Ghulamali
(74) Attorney, Agent, or Firm — Aslan Law, P.C.

(57) ABSTRACT

A monitoring and anti-theft alarm system for a motor vehicle. The system comprises a plurality of sensors that detect vibration, motion, opening and damage to the vehicle, which sensors transmit or interrupt a respective signal to a processor which communicates with a wireless communication device such that the alarm system is able to communicate with a mobile device of the vehicle's owner to receive, on said mobile device, status reports of the vehicle after the detection of an alarm situation detected by the system and/or following the request, through the mobile device, of an updated status report of the vehicle.

19 Claims, 12 Drawing Sheets

(56) References Cited

U.S. PATENT DOCUMENTS

| | | | | |
|---|---|---|---|---|
| 9,942,420 B2* | 4/2018 | Rao | ............... | G06F 3/005 |
| 2003/0095039 A1* | 5/2003 | Shimomura | ............ | B60R 25/102 |
| | | | | 340/426.1 |

FOREIGN PATENT DOCUMENTS

| | | | |
|---|---|---|---|
| CN | 104309574 A | | 1/2015 |
| CN | 104608739 A | | 5/2015 |
| ES | 2365370 A1 | | 9/2011 |
| GB | 2393550 A | | 3/2004 |
| JP | 2003063357 A | | 3/2003 |
| KR | 20020049118 A | | 6/2002 |
| WO | WO 0132481 A1 | | 5/2001 |

\* cited by examiner

ALARM SYSTEM FOR A VEHICLE INTEGRATING WIRELESS COMMUNICATION DEVICES AND MOBILE DEVICES ASSOCIATED WITH SAID SYSTEM

CROSS-REFERENCE TO RELATED APPLICATIONS

This application claims priority to Mexican Patent Application No. MX/a/2016/012080 filed on Sep. 15, 2016, and to PCT Application No. PCT/IB2017/055095 filed on Aug. 24, 2017, the entire contents of which are hereby incorporated by reference.

FIELD OF THE INVENTION

The present invention relates to a monitoring and anti-theft alarm system for a motor vehicle having integrated at least one mobile communication device that is able to communicate with at least one mobile device of the vehicle's owner, to constantly and on demand monitoring and informing the vehicle status to the mobile device of the vehicle's owner.

The invention also relates to methods for monitoring and informing the vehicle status as well as systems and mobile devices to carry out said methods.

The invention also relates to computer readable means able of generating a graphical interface for the user and to carry out steps of the methods according to embodiments of the invention.

BACKGROUND

Common anti-theft alarm systems for vehicles are usually configured to mainly detect the vibration of a component of the vehicle and/or the opening of any door when said vehicle alarm system is activated, and after detecting any of these events, i.e. detecting vibration of the vehicle's component or opening of a vehicle's door, the system triggers a sound alarm, e.g. by turning-on the vehicle's horn and/or turning-on a luminous alarm, for example by intermittently turning the vehicle's lights on and off, as an attempt to threaten a possible burglar or announce the attempt of robbery of the vehicle.

Systems with these functions are known in a number of types depending on the capabilities of the system. For instance, there are systems configured to trigger either a sound alarm or luminous alarm of the aforementioned type to threaten burglars. There also exist systems configured to emit a signal to a receiving device of the vehicle's owner notifying the triggering of the vehicle's alarm. There also exist systems that integrate a unidirectional wireless communication device allowing the vehicle's owner to remotely control the activation and deactivation of the alarm.

Nevertheless, these known systems suffer from several disadvantages. For instance, the vehicle's owner cannot know the status of the vehicle at a determined time or take any action on the functions of the alarm system since these systems are unable to send specific information about the event that triggered the alarm in the vehicle.

An improvement to systems of the type mentioned above consisted in that the alarm system is equipped with a wireless communication device adapted to inform that the alarm has been triggered to a remote device, such as a cellular phone of the vehicle's owner. Such a system is known, for example from document U.S. Pat. No. 6,542,072, which discloses a system in which, upon triggering of the alarm in the vehicle, a communication interface sends a signal to a communication device of the vehicle's owner to inform about the triggering of the alarm system. Further, the vehicle's owner is capable to send, through the communication device, a control signal back to the alarm system in the vehicle to activate a function, for example to trigger a sound alarm. However, this system still has some drawbacks, for instance: the signal is sent to the mobile device of the owner only upon the triggering of the alarm in the vehicle; consequently, the vehicle's owner cannot constantly and reliably know the status of the vehicle or know the particular event or specific situation that triggered the alarm in the vehicle.

Another similar system is known from document JP2003063357. This known alarm system is limited to detecting the opening of a door and informing a cell phone of the vehicle's owner that the door has been opened. The possibility to hear inside the cabin of the vehicle so that the vehicle's owner can determine the occurrence of a robbery is also disclosed in this document. However, this system does not allow the vehicle's owner to take any actions to threaten the burglar, and the system is limited to detecting that the door is opened. Further, this known system does not provide any means to continuously inform the status of the vehicle.

Another similar system is known from document GB 2 393 550 in which, when the alarm detects an alert situation, for example the opening of a door, the system informs it to the vehicle's owner through a mobile telephone and allows the vehicle's owner to hear and communicate with any person inside the vehicle, similarly to a conventional telephone conversation. However, this system only communicates with the vehicle's owner after the triggering of the alarm in the vehicle. Further, the system does not continuously inform the status or conditions of the vehicle, and the alarm system is limited to the detection of a single event, namely the opening of a door, that triggers the alarm.

An improved system is known from document CN102390351, which essentially discloses an alarm system comprising, among others elements, a central processing module, a wireless communication module, and a GPS (Global Positioning System) module. According to this document, the central processing module may interact with a mobile phone of the vehicle's owner through the wireless communication device. The wireless communication device supports the transmission of images and messages such as Short Message Service ("SMS") so that the vehicle's owner is able to determine that an intruder gained access into the vehicle and to remotely control anti-theft means, such as a spray device, to subdue or threaten the burglar inside the vehicle. This document merely teaches a wireless communication device that supports the transmission of images and SMS messages so that the vehicle's owner is able to determine, based on the information transmitted by the central processing module, that an unauthorized person is inside the vehicle and that allows the vehicle's owner to remotely control anti-theft means installed on the vehicle. However, the vehicle's owner cannot continuously know the status of the vehicle or determine other conditions or situations that could have triggered-on the alarm.

Another similar alarm system is known from document CN202806683, which comprises a control module communicating with a GSM module and a GPS module. According to this document, the control module can be used to control the stopping or locking of the vehicle as well as to track the vehicle's position by means of a mobile phone of the vehicle's owner.

From document KR20020049118 it is known a wireless communication system for handling transmission of information from a vehicle terminal to a vehicle's owner by using mobile Internet Protocol (IP). In this known system, the vehicle's owner monitors vehicle status information that is received from the wireless communication system, generates an alarm from the information received, and generates an alarm signal that is transmitted to the wireless communication system, and which in turn is forwarded to the vehicle terminal. This alarm system is limited to the transmission of information so that the vehicle's owner can generate an alarm to be sent to the vehicle terminal. This system, however, does not automatically trigger-on the alarm because the triggering is performed by the vehicle's owner based on the information transmitted and it also does not allow the vehicle's owner to consult the conditions of the vehicle on demand, for example in absence of information transmitted from the wireless communication system, in particular after a determined time.

Yet another similar system is known from document WO 01/32481 A1, which discloses a process and system for continuously broadcasting a "Safe" code to a pager of the vehicle's owner. The "Safe" code is transmitted to notify a normal status of the alarm system. A "Warning" code is transmitted instead of the "Safe" code after detecting robbery. In addition, the vehicle's owner is informed of an alarm status with the "Warning" code or alternatively in absence of the "Safe" and "Warning" codes.

None of the known systems has the capability for constantly and on demand monitoring and informing the status of the vehicle to the vehicle's owner, such that the alarm system and the vehicle's owner can reliably determine whether the vehicle is being subject of an attempt of robbery, also in absence of a status report from the alarm system, and activate anti-theft means installed on the vehicle.

Furthermore, most of the known systems are restricted to the detection of limited conditions like the opening of a door and/or vibration of a component of the vehicle; however, these systems are not able to detect other important events that can be interpreted as attempts of total or partial robbery or causing damage to the vehicle, for example impacts and/or breakage of the windows of the vehicle and/or manipulation of the door handles, which may be interpreted as attempts of a burglar to gain access into the vehicle, impacts on the chassis that may be interpreted as collisions by other vehicles or artifacts, or scratches on the chassis and/or windows that may be interpreted as damages caused by accidents or by vandals; motion or rotation of the wheels that may be interpreted as an attempt of towing the vehicle; opening of the hood that may be interpreted as an attempt of partial robbery or as an attempt of causing mechanical damage to the vehicle; and other similar situations that may also be interpreted as attempts of robbery or causing damage to the vehicle.

Moreover, despite the improvements to systems using wireless communication devices that inform the vehicle's owner about the triggering of the alarm and that allow the vehicle's owner to wirelessly activate means to threaten burglars, it is not possible to constantly inform the status of the vehicle and simultaneously allow the vehicle's owner to request information about the status of the vehicle, for example in absence of information sent by the vehicle alarm system after a determined lapse of time.

In addition, to date, known alarm systems using mobile devices have not exploited the unlimited capabilities of interactive mobile applications (commonly known as "apps") running on mobile devices in connection with the transmission of information through SMS, data packets and/or Internet protocol.

These deficiencies, drawbacks and technological slowdowns in the alarm systems known in the state of art result in non-reliably and not quite secure systems.

Consequently, there is a need for a more reliable, secure and interactive vehicle monitoring and anti-theft alarm system able to constantly and on-demand monitoring and informing the status of the vehicle to the vehicle's owner and reliably determining alarm situations such as attempts of robbery or causing damage to the vehicle while at the same time providing the vehicle's owner with the possibility to request updated information about the vehicle status, to trigger-on alarm means to threaten burglars and/or to inform authorities and/or insurance agents about damages to the vehicle.

SUMMARY

For at least the aforementioned reasons, a main object of the invention is to provide a vehicle monitoring and anti-theft alarm system with improved security and reliability.

A further object of the invention is to provide systems and methods to reliably monitor and wirelessly inform the status of the vehicle on a time basis and on demand, i.e. upon request by a vehicle's owner through a wireless communication device, in particular in absence of information transmitted from the vehicle monitoring and anti-theft alarm system to the vehicle's owner after a determined time.

Another object of the invention is to provide a system and method to reliably detect, use and transmit signals acquired from at least one sensor installed on the vehicle to determine, either by the alarm system or by the vehicle's owner, attempts of robbery and/or causing damage to the vehicle.

Another object of the invention is to provide systems and methods to activate and deactivate alert and/or anti-theft means after determining an alarm situation and/or determining an attempt of robbery and/or causing damage to the vehicle.

A further object of the invention is to provide a vehicle alarm system integrating at least a wireless communication device able to transmit and receive information and/or signals to communicate with at least a wireless communication device of the vehicle's owner.

Another object of the invention is to provide a wireless communication device able to transmit and receive information and/or signals, for example in the form of SMS messages or data packets, as well as a mobile device of the vehicle's owner able to display status information of the vehicle, in particular on an interactive platform or mobile application (app) running on the mobile device of the vehicle's owner.

Another object of the invention is to provide a graphic interactive application (app) running on at least one mobile device of the vehicle's owner to display vehicle status information received from a wireless communication device of the vehicle alarm system, thus allowing the vehicle's owner to generate and transmit information, in particular SMS messages and/or data packets back to the vehicle alarm system to request an update about the status information of the vehicle, and also to enable or disable the vehicle alarm system, and to activate and deactivate alarm and anti-theft means in the vehicle.

Still another object of the invention is to provide a vehicle alarm system and the mobile device of the vehicle's owner with the capability to support transmission and reception of signals according to GSM/GPRS/3G/4G, similar or equivalent, mobile communication protocols.

To achieve the aforementioned objects, in a first aspect of the invention, it is disclosed a vehicle alarm system having a plurality of sensors able to detect a plurality of signals, which can be associated to alarm events or situations, wherein said sensors are able to generate and transmit, or interrupt, signals to a processor which in turn communicates, through an interface, with a wireless communication device integrated in the vehicle alarm system that is able to wirelessly transmit signals in the form of SMS messages and/or data packets to a mobile device of the vehicle's owner to inform the status of the vehicle by means of status reports that include information related to the signals detected or interrupted by the plurality of sensors. The mobile device of the vehicle's owner is thus able to use the information contained in the messages or data packets received in conjunction with a mobile application running on the mobile device of the vehicle's owner in the form of a graphic interactive interface that displays on a screen of the mobile device of the vehicle's owner said information allowing the vehicle's owner to know the status of the vehicle and specific events that triggered an alarm event or situation in the vehicle, while at the same time the mobile device of the vehicle's owner is configured to transmit signals such as SMS messages and/or data packets to the wireless mobile device of the vehicle alarm system to activate and deactivate anti-theft means in the vehicle after determining an alarm situation, and also to request an updated status report of the vehicle, for example in the absence of the reception of a status report from the vehicle alarm system after a determined lapse of time.

With the system of the present invention, it is possible to know the status of the vehicle in every moment and practically at any location, and at the same time it is possible to know the specific events or situations that triggered an alarm situation in the vehicle.

These and other objects and advantages of the invention will be more readily understood from the following detailed description in conjunction with the appended drawings which show, in an exemplary and non-limitative way, embodiments of the invention.

DETAILED DESCRIPTION

As it is known in the field of the invention, a typical vehicle alarm system mainly has two operative states, which are selected through an electromagnetic signal sent, for example from a remote control that is commonly integrated in the main key of the vehicle, namely a "Disabled State" and an Enabled State". In the "Disabled State" no event is detected by the sensors of the vehicle alarm system and it allows the vehicle to be driven by a user. In the "Enabled State" the sensors of the vehicle are able to detect and transmit electrical signals to a processor of the vehicle alarm system to trigger a sound alarm and/or a luminous alarm.

The following description of several aspects of the present invention will be made with reference to the "Enabled State" of the system unless otherwise specified. Likewise, in the following the terms "vehicle monitoring and anti-theft system" and "vehicle alarm system" will be used indistinctly for the sake of clarity and simplicity unless otherwise specified without departing from the spirit and scope of the invention. In the same way, elements or components of the invention that may be similar or equivalent to those known in the state of art as shown in FIGS. 1 and 2, are referred to using like reference numbers unless otherwise indicated.

Figure 1:
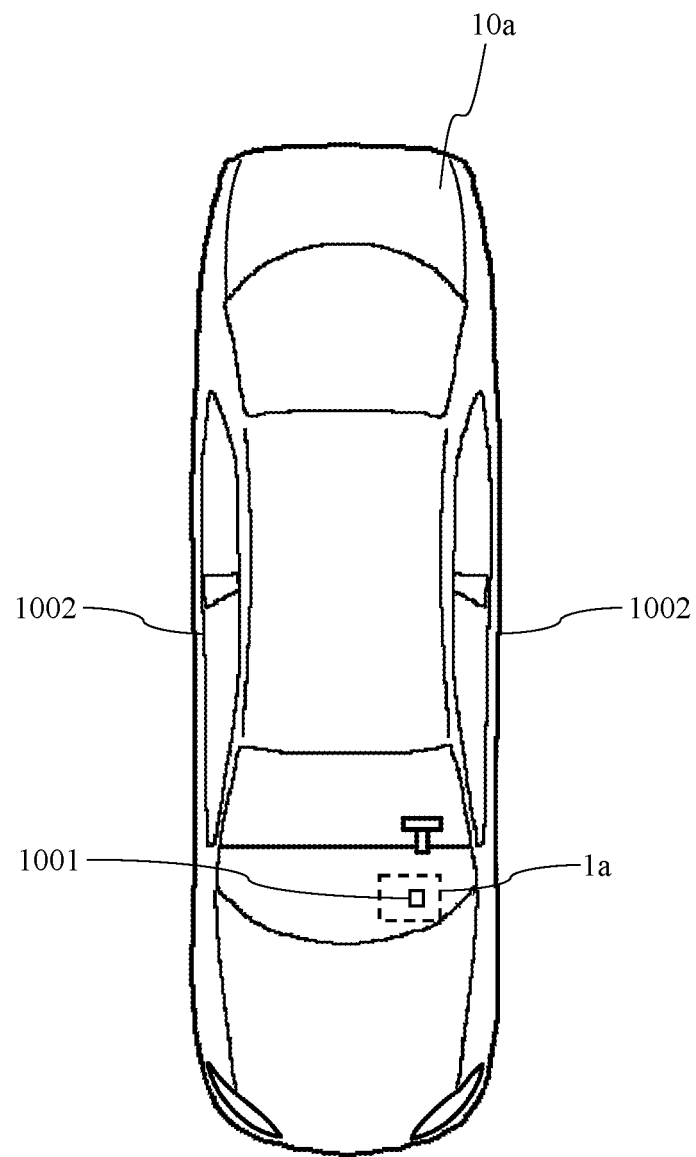
FIG. 1 is a schematic representation of a motor vehicle embodying a vehicle alarm system according to the prior art.

Referring to FIG. 1, there is depicted a vehicle 10a with a vehicle alarm system 1a known in the state-of-the-art, said system comprises a sensor 1001 (not shown in detail) to detect the vibration of the vehicle and two sensors 1002 (not shown in detail) to detect the opening of the doors when the vehicle alarm system is in the "Enabled State".

The design, specifications and functioning of the sensors 1001 and 1002 are known to those skilled in the art. The sensors to detect vibration may be, for example of the type including but not limited to mechanical, electromechanical or electronic accelerometers, whereas the sensors to detect the opening of the doors consist in, for example a mechanical, electromechanical or electronic relay having at least a Normally Closed (NC) state and a Normally Opened (NO) state to detect changes in the position of a mechanism, in particular a lever, associated to the door in such a way that when the door is manipulated to open it, an internal mechanism associated to the relay also causes a change in the relay from a NO state into a NC state or vice versa thus transmitting an electrical signal to the alarm system, which in turn triggers a sound and/or luminous alarm in the vehicle.

Figure 2:
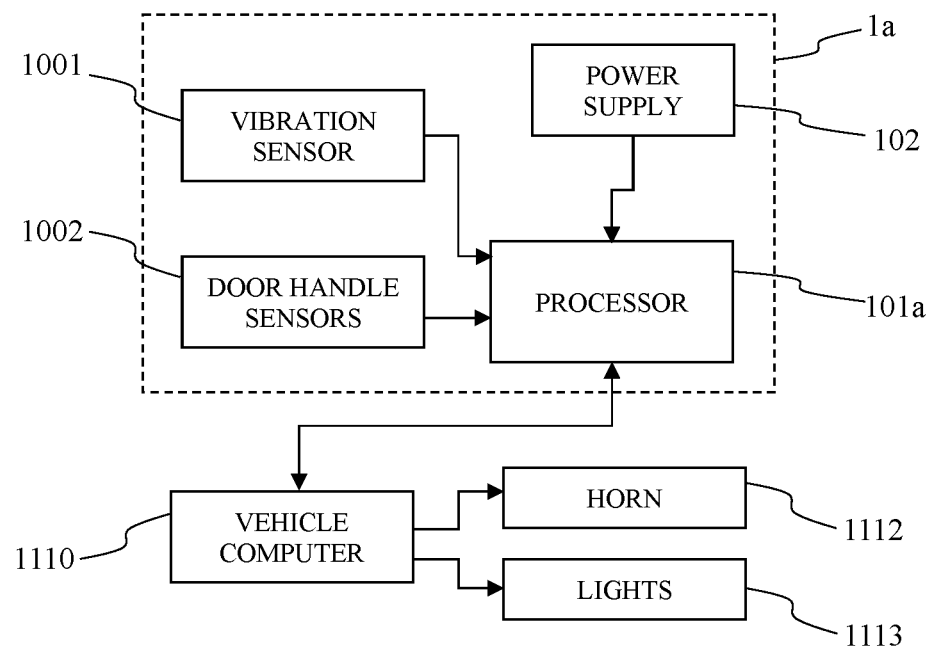
FIG. 2 shows a block diagram of a vehicle alarm system according to the prior art.

Referring to FIG. 2, there are shown the elements of a vehicle alarm system 1a known from the prior art. The alarm system 1a comprises a processor 101a powered by a power supply 102. Commonly, the power supply 102 can be a battery of the vehicle (not shown in the drawings) or another rechargeable-type battery. The vibration sensor 1001 is connected to the processor 101a in such a way that, when the alarm system is in the "Enabled State", the sensor 1001 is able to detect movements of any component of the vehicle and, responsive thereto, it transmits an electrical signal to the processor 101a. Similarly, the sensors 1002 are connected to the processor 101a in such a way that, when the alarm system is in the "Enabled State," the sensors 1002 detect the manipulation of a lever and transmit or interrupt an electrical signal to the processor 101a indicating a change in the NO state into the NC state or vice versa, which means that a person, possibly a burglar, is trying to open the vehicle door to gain access into the vehicle. When the processor 101a receives or interrupts a signal from any or both of the sensors 1001 and 1002, and the vehicle alarm system is in the "Enabled State", the system then transmits an electrical signal to a vehicle computer 1110 (not shown in the drawings) which in turn is configured to activate a sound alarm, for example by turning-on a horn 1112 of the vehicle, and/or a luminous alarm, for example by turning the vehicle's lights on and off, as an attempt to threaten or reveal the burglar or call for attention of authorities or any other person near the vehicle.

Furthermore, the processor 101a can be further connected to an antenna to receive wireless signals from a remote control embedded or associated to the main key of the vehicle. Said antenna is commonly used to receive a signal that enables or disables the alarm system 1a remotely.

Although it is not exemplified in the drawings, it is also possible for the processor 101a to directly control the activation and deactivation of the horn 1112 and lights 1113 of the vehicle without a direct connection to the vehicle computer 1110.

Thus, FIGS. 1 and 2 depict a system of the prior art that is only able to trigger an alarm when the system detects any or both events of vibration of a vehicle's component and manipulation of the doors when the system is in the "Enabled State." This prior art system suffers from the disadvantages mentioned herein before.

Figure 3:
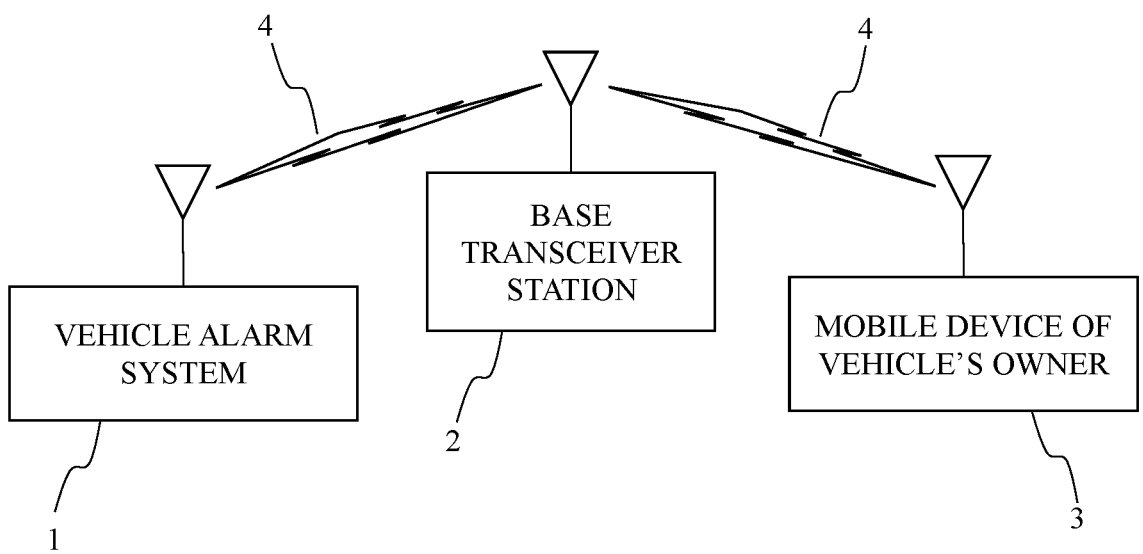
FIG. 3 is a block diagram of a vehicle alarm system communicating with a mobile device of the vehicle's owner through a base transceiver station according to embodiments of the present invention.

With reference now to FIG. 3, there is shown a block diagram of a vehicle alarm system 1 according to embodiments of the present invention, which is able to communicate with a Base Transceiver Station (BTS) 2 through wireless signals 4. A mobile device 3 belonging to the vehicle's owner is also able to communicate with the base transceiver station 2 through wireless signals 4. Therefore, according to embodiments of the present invention, the vehicle alarm system 1 is able to transmit to, and receive from, the mobile device 3 of the vehicle's owner, wireless signals 4 via the BTS 2 according to any existing wireless communications technology, such as GSM, CDMA, similar or equivalent. In particular, said signals 4 can be SMS messages and/or data packets. Likewise, the mobile device 3 is able to receive from, and transmit to the alarm system 1, signals 4 in the form of SMS messages and/or data packets via the BTS 2.

The alarm system 1 and mobile device 3 can also be able to communicate with each other through other wireless technology, such as infrared, Bluetooth®, and the like or equivalent.

Figure 4:
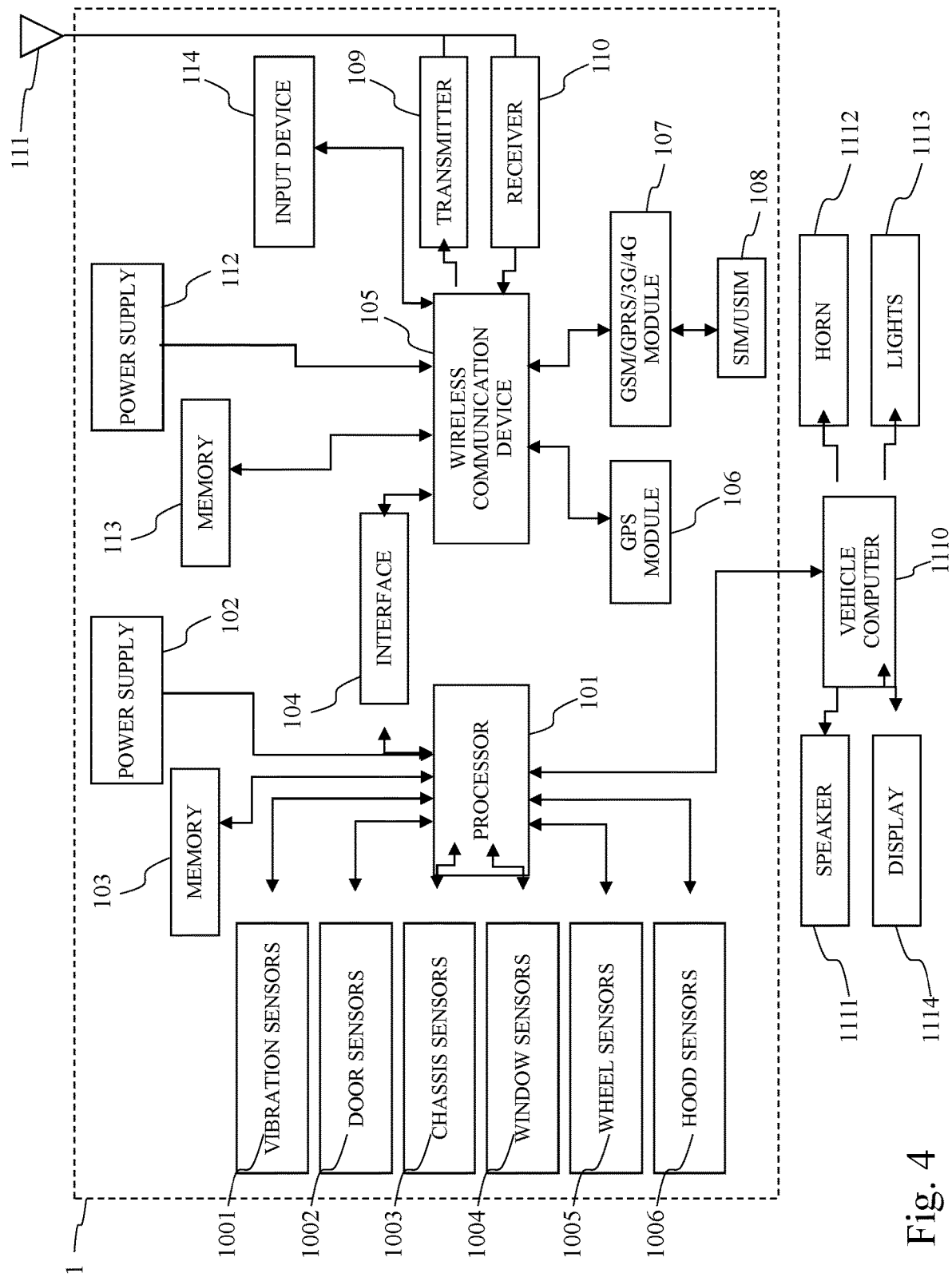
FIG. 4 shows a block diagram of a vehicle alarm system according to embodiments of the present invention.

With reference now to FIG. 4, there is shown a block diagram of the alarm system 1 according to embodiments of the present invention. The system 1 includes a main processor 101 that is powered by a power supply 102. The power supply 102 can be the battery of the vehicle (not shown in the drawings) or a separate rechargeable battery installed in the vehicle. The system 1 can further include a memory 103 that is usable by the processor 101 for reading and storing instructions, data or information for both the appropriate functioning thereof and to establish communication with a wireless communication device 105, as described herein below.

The memory 103 can be a Read-Only Memory (ROM), Random Access Memory (RAM), Erasable Programmable Read-Only Memory (EPROM), Electrically Erasable Programmable Read-Only Memory (EEPROM), flash memory, or any other memory or combinations thereof as long as they are usable and readable by the processor 101.

The system 1 of the invention further comprises a plurality of sensors to detect the vibration of one or several components of the vehicle, for example vibration sensors 1001, and sensors to detect the manipulation of the door handles like the door sensors 1002, similar or equivalent to those previously described with reference to the prior art system 1a.

Advantageously, the system according to embodiments of the invention further comprises a plurality of different sensors able to detect other alarm events or situations that can be interpreted as attempts of partial or total robbery or to cause damage to the vehicle. To this end, the system 1 according to embodiments of the invention further includes at least one sensor 1003 installed on the chassis of the vehicle, at least one sensor 1004 installed on at least one window, at least one sensor 1005 installed on or close to at least a wheel, and at least one sensor 1006 installed on the hood of the vehicle, which are described in greater detail below.

In an aspect of the present invention, it is also envisioned the possibility of providing sensors 1002 to detect the opening of the vehicle's doors with the use of switches of the "Push Button" type, which also have a Normally Closed (NC) and a Normally Opened (NO) state, and which are described in further detail below. Switches of the Push Button-type are commonly installed in a suitable manner to the vehicle chassis, and are typically associated to the internal lightning system of the vehicle in such a way that the opening of a door turns-on inner lights in the vehicle. However, for the purpose of this particular aspect of the invention, push buttons can also be used as sensors to detect the opening of the door in such a way that, when the vehicle alarm system is in the "Enabled State," the opening of a door will change the NO or NC state of the sensor into the other NC or NO state respectively, and such change will cause the transmission or interruption of an electrical signal to the processor 101. The processor 101 then generates and transmits an electrical signal to the vehicle computer 1110 to trigger a sound and/or luminous alarm, as previously mentioned. In addition, both types of sensors 1002 previously described, namely of the type having a lever mechanism associated to a door handle and of the Push Button-type, can be used in the present invention, and reference will be made to both or only one of them indistinctly in the following description unless otherwise indicated.

Figure 5:
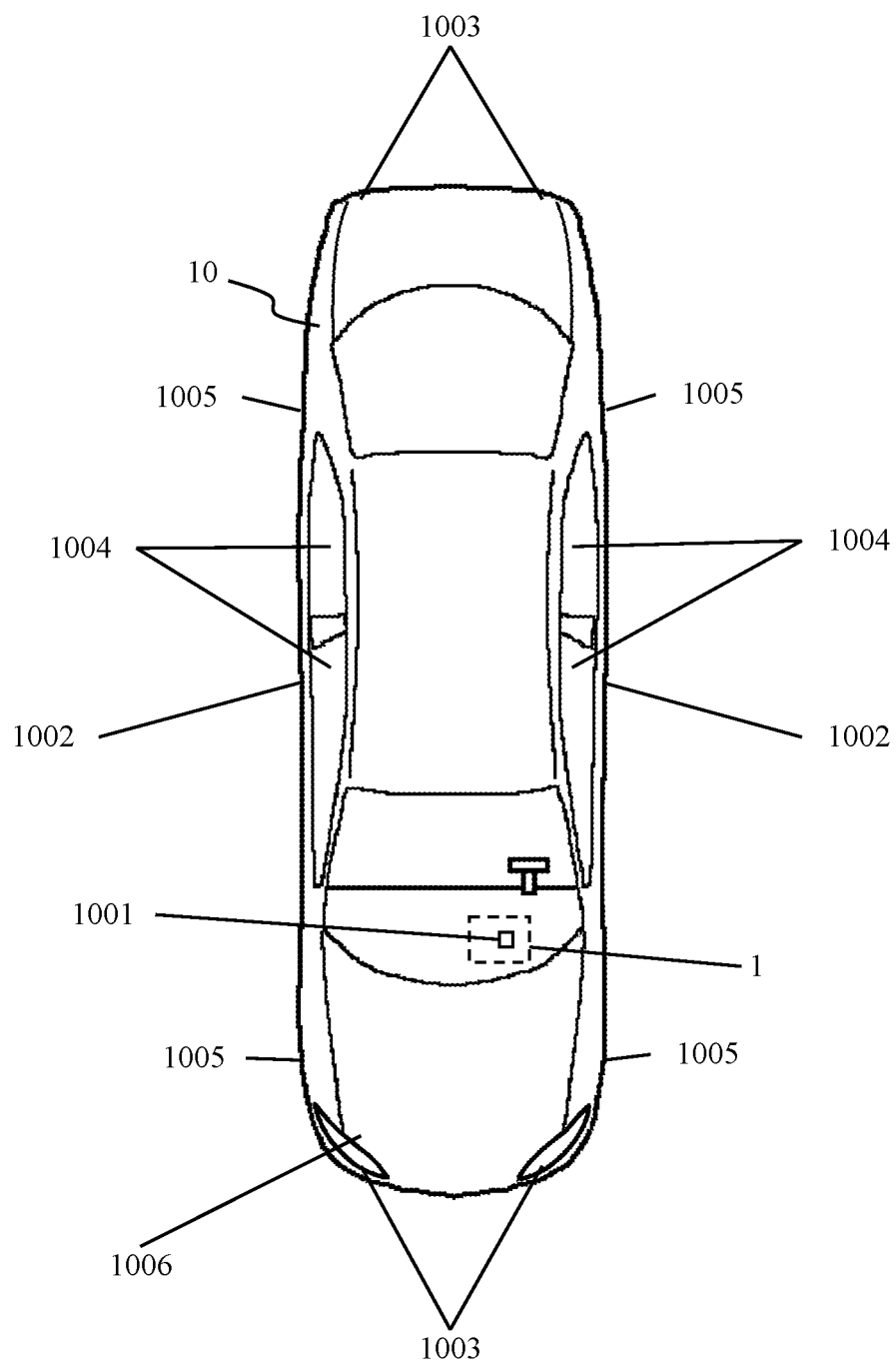
FIG. 5 is a schematic representation of a vehicle having a plurality of sensors and an alarm system according to embodiments of the present invention.

The sensors 1003 to 1006 according to embodiments of the invention will be described below with reference to FIGS. 4 and 5.

The system 1 of the invention comprises at least one sensor 1003 installed in an appropriate manner on one or several structural parts of the vehicle, for example on the front bumper, rear bumper, and doors of the vehicle. The sensors 1003 are essentially similar to the vibration sensors 1001 so as to be able to detect vibrations or sudden intense movements of the parts said sensors 1003 are installed on. Thus, the sensors 1003 are envisioned particularly like motion sensors such as accelerometers, and in particular as electronic accelerometers, which are known by those skilled in the art.

In operation, when the vehicle alarm system 1 is in the "Enabled State," an object causing a sudden oscillatory or vibratory motion or impacting directly on the chassis of the vehicle, for example due to an accident or collision, activates at least one of the sensors 1003, which in turn send an electrical signal to the processor 101 in function of the frequency, such that the processor 101 can generate and transmit an electrical signal to the vehicle computer 1110 to trigger a sound alarm 1112 and/or luminous alarm 1113.

The use of high sensitive sensors will increase the reliability and detecting capabilities of the system. For instance, high sensitive sensors installed on the doors of the vehicle are capable of detecting slight vibrations caused by, for example, sharp objects that a person may use to scratch the vehicle's paint. Such an event may be interpreted as a destructive action or vandalism, which can be reported to the vehicle's owner through the wireless communication devices as it will be described in further detail below.

The vehicle alarm system 1 further comprises at least one sensor 1004 to detect partial fractures and/or total breakage of at least one window of the vehicle. For instance, a sensor 1004 or an array of sensors 1004 can be installed or embedded in the vehicle driver's door in such a way that, when the vehicle alarm system is in the "Enabled State," the partial or total breakage of the window is detected by the sensor or sensors array 1004, which in turn transmits or interrupts an electrical signal to the processor 101. The processor 101 is then able to generate and transmit an electrical signal to the vehicle computer 1110 to trigger a sound and/or luminous alarm as previously described.

In the present invention, the sensors 1004 are envisioned as a circuit with a plurality of electrically conductive elements, preferably clear or transparent, arranged in a grid or net that is encapsulated or laminated between the layers of a laminated glazing from which the windows of a motor vehicle are usually fabricated. By way of example, there can be used a plurality of clear transistors laminated in a glazing, which are connected in such a way that the breakage of the glazing causes the rupture of the connections between the transistors and in this way the fracture or rupture of the glazing is detected due to the rupture in the connections of the transistors.

In a similar manner, a grid or net of conductive elements embedded between crystal laminates or plastic films can be used in the present invention to detect fractures or breakage of a vehicle's glazing or window, in particular of the door. In this aspect of the invention, the sensors 1004 consist of an array of conductive elements, such as transistors (not shown in detail in the drawings), wherein said array has at least two terminals connected to the processor 101. The processor 101 is configured to supply said array of conductive elements with an electrical current in such a way that a partial fracture or total breakage of the window will break the connections among the conductive elements thereby interrupting the supply of current. Such interruption of the current supply is detected by the processor 101, which in turn generates and transmits an electrical signal to the vehicle computer 1110 to trigger a sound and/or luminous alarm.

Alternatively or in addition, the processor 101 can be configured to supply a current intermittently, i.e., for predetermined lapses of time, in such a way that the sensors 1004 do not consume energy all the time. This feature of the invention has the advantage of saving energy. For this purpose, the processor can include, or can be connected to, a clock circuit (not shown). In this way, the processor 101 supplies a current for predetermined lapses of time. For instance, the processor emits a pulse of 1 Volt or less with a current of 200 mA or less for a period of time of 0.5 seconds or less, for intervals every 2, 5, or 10 minutes.

It is to be understood that these values of voltage, current and time may be greater or smaller depending on the functional parameters of the sensors 1004 and of the processor 101.

In operation, when the processor 101 emits a pulse but there is no feedback from the sensors 1004, this means that the window has a total or partial fracture. In such a situation, the processor 101 will generate and transmit an electrical signal to the vehicle computer 1110 to trigger a sound and/or luminous alarm.

Consequently, the event of a partial fracture or total breakage of a window of the vehicle can be detected by the system as a possible accident, as a destructive action by vandals or as an attempt of robbery. Such an event can be informed to the vehicle's owner through the wireless communication devices and the mobile device of the vehicle's owner as it will be described below.

The vehicle alarm system 1 further comprises at least one sensor 1005 to detect the rotation or motion of at least one wheel of the vehicle. These sensors 1005 are envisioned as inductive, capacitive or infrared sensors, or even as a combination thereof, and are installed near the wheels to detect rotation and motion of the same without affecting their normal operation. Inductive, capacitive and infrared sensors are well known to those skilled in the art. Alternatively, the function of the sensors 1005 can be combined or replaced by the odometer of the vehicle itself, which is a device known to those skilled in the art.

In the present invention, when the vehicle alarm system 1 is in the "Enabled State," the rotation of any or several of the wheels will be detected by the sensors 1005, which in turn will transmit an electrical signal to the processor 101. The processor 101 then generates and transmits an electrical signal to the vehicle computer 1110, which in turn will trigger a sound and/or luminous alarm. Consequently, the event of the vehicle being towed can be detected by the vehicle alarm system.

The vehicle alarm system 1 also comprises at least one sensor 1006 to detect the opening of the hood of the vehicle. According to embodiments of the invention, the sensors 1006 are envisioned as switches of the "Push Button" type, as previously described with reference to an embodiment of the door sensors 1002. Therefore, the sensors 1006 have a Normally Closed (NC) and a Normally Opened (NO) state. When the switch is in the NC state, it conducts a current supplied thereto; conversely, when the push button is in the NO state, it is not conductive. In the present invention, at least one sensor or switch 1006 is installed in a suitable manner under the hood of the vehicle in such a way that, when the vehicle alarm system 1 is in the "Enabled State," the opening of the hood changes the sensor from the NO state into the NC state, thus conducting a current supplied by the processor 101; the feedback signal from the sensor is thus detected by the processor 101, which in turn generates and transmits an electrical signal to the vehicle computer 1110 to trigger a sound and/or luminous alarm.

Accordingly, the vehicle alarm system 1 is able to detect the opening of the vehicle's hood. Such an event or situation may be interpreted as an attempt of causing malfunction of the vehicle or even as an attempt to impair the vehicle alarm system 1 itself.

A skilled person will understand that a greater quantity of sensors 1001-1006 will increase the reliability and security of the system; nevertheless, the quantity of sensors could be an issue when looking for a cost effective system. For this reason, it is conceived in an aspect of the invention that at least one sensor of each of the aforementioned types 1001-1006 is installed on the system to ensure a reasonable level of reliability and security.

Thus, the vehicle alarm system 1 of the invention is able to detect diverse alarm events that can be interpreted as attempts of causing damage or partial or total robbery. These alarm events or situations can directly or indirectly cause the processor 101 to trigger a sound and/or luminous alarm by means of the vehicle's computer 1110.

Advantageously, in an aspect of the invention the system is able to wirelessly and remotely inform a vehicle's owner about the occurrence of any or several of the aforementioned alarm events, alternatively or in addition to the simultaneous activation of the sound and/or luminous alarm in the vehicle. For this purpose, the vehicle alarm system 1 further comprises a wireless communication device 105 that is configured to generate and transmit wireless signals 4 to a mobile device 3 of the vehicle's owner through the BTS 2, as it is depicted in FIG. 3. Similarly, the mobile device 3 of the vehicle's owner is configured to generate and transmit wireless signals 4 to the vehicle alarm system 1, in particular to the wireless communication device 105, through the BTS 2, as it is described below.

The wireless communication device 105 of the vehicle alarm system 1 according to embodiments of the invention is described in further detail below with reference to FIG. 4.

The wireless communication device 105 is powered by a power supply 112. The power supply 112 can be the battery of the vehicle or any other suitable rechargeable battery. The wireless communication device 105 is also connected to, or comprises, at least a memory 113 that is usable by the wireless communication device 105, in particular by a processing unit thereof (not shown in the drawings), for reading and storing instructions, data, codes, or the like, for the appropriate functioning thereof as well as for communication with other modules and components of the wireless communication device and of the vehicle alarm system. The memory 113 can be ROM, RAM, EPROM, EEPROM, flash memory, or any other memory or a combination thereof as long as it is usable by the wireless communication device 105.

The wireless communication device 105 is further connected to, or includes, a GPS module 106, a GSM/GPRS/3G/4G module 107, and SIM/USIM 108. All these components and their functioning are known to those skilled in the art.

In general terms, the GSM/GPRS/3G/4G module 107 and SIM/USIM 108 allow the wireless communication device 105 to communicate with other mobile devices, such as the mobile device 3 of the vehicle's owner, through the BTS 2. To this end, the wireless communication device 105 further comprises a transmitter 109 and a receiver 110, which are in turn connected to an antenna 111. Transmitter 109 is configured to handle uplink communications with the BTS 2, whilst the receiver 110 is configured to handle downlink communications with the BTS 2.

The wireless communication device 105 further comprises at least one data input device 114 such as an image and/or video capturing device, in particular a photo camera. The data in the form of images and/or video captured by the input device 114 can be stored on the memory 113 such that the wireless communication device 105 can transmit said data, through the transmitter 109 and antenna 111, to other mobile devices.

As mentioned above, the processor 101 is able to generate and transmit signals to the vehicle computer 1110 to trigger a sound and/or luminous alarm in the vehicle upon detection of motion or vibration of the vehicle or of specific parts thereof as well as the detection of fractures or breakage of windows of the vehicle as explained above. Alternatively, the processor 101 itself can activate a sound and/or luminous alarm in the vehicle without any connection to the vehicle computer 1110 in function of the events of motion, vibration, fracture and breakage detected by the sensors 1001-1006.

In an additional aspect of the invention, the processor 101 is further configured to generate and transmit signals to the wireless communication device 105 in addition to, or alternatively to, the sending of signals to the vehicle computer 1110 to wirelessly and remotely inform the mobile device 3 of the vehicle's owner about the occurrence of the events detected by the sensors 1001-1006. For this purpose, the vehicle alarm system 1 further comprises an interface 104. The interface 104 includes first signal conversion circuitry configured to adapt or convert the signals received from the processor 101 into signals, instructions and/or codes readable and usable by the wireless communication device 105 which in turn, responsive to said signals, instructions and/or codes, generates and transmits, through the transmitter 109 and antenna 111, wireless signals 4 in the form of SMS messages and/or data packets, to the mobile device 3 of the vehicle's owner through the BTS 2.

Conversely, the wireless communication device 105 is also configured to generate and transmit signals to the processor 101 through the interface 104. For this purpose, the interface 104 includes second signal conversion circuitry configured to adapt or convert the signals received from the wireless communication device 105 into signals, codes or instructions readable and usable by the processor 101. The processor 101 is thus configured to generate and transmit signals to the vehicle computer 1110 based on the signals, codes or instructions received from the wireless communication device 105.

In addition, the processor 101 is configured to transmit visual or audio signals previously stored on the memory 103 or acquired through the wireless communication device 105, as it will be described in detail below. Audio signals are transmitted to the vehicle computer 1110 to be reproduced in a suitable player, such as a speaker 1111 (see FIG. 4) installed on the vehicle. Similarly, visual signals are transmitted to the vehicle computer 1110 to be displayed in a suitable display connected thereto, such as the display 1114 (e.g., an LCD screen, a touch panel, or the like) properly installed on the vehicle. The audio or visual signal is intended to be reproduced or displayed by the speaker or display respectively as an attempt to threaten burglars or vandals inside or outside the vehicle either immediately after detecting an event by means of the sensors 1001-1006 or after receiving a signal transmitted by the mobile device 3 of the vehicle's owner.

Thus, the vehicle alarm system 1 according to embodiments of the invention is able to directly or indirectly trigger a sound and/or luminous alarm based on the detections of the sensors 1001-1006, but it is also able to simultaneously, remotely and wirelessly inform a mobile device 3 of the vehicle's owner about the occurrence of the events detected by the sensors 1001-1006. Advantageously, the vehicle alarm system 1 is also able to receive signals from the mobile device 3 of the vehicle's owner to trigger a sound and/or luminous alarm and to play/display audio and visual signals in the vehicle.

Figure 6:
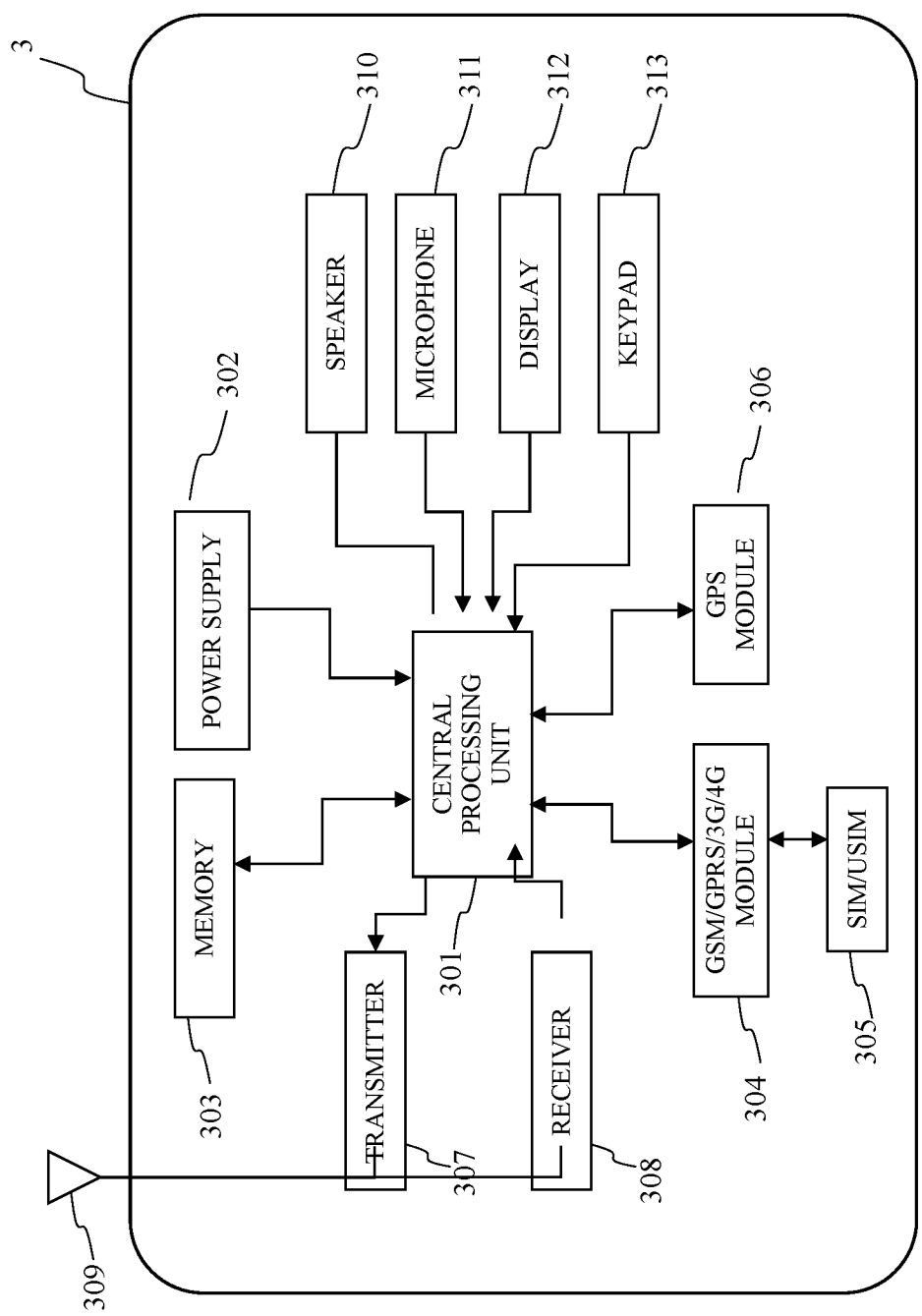
FIG. 6 shows a block diagram of a mobile device according to embodiments of the present invention.

With reference now to FIG. 6, there is shown a block diagram with overall features of a mobile device 3 that is intended to belong to vehicle's owner. The mobile device 3, also known as mobile phone, or simply phone, is envisioned as a typical Mobile Station (MS) supporting one or more communication technologies such as GSM, GPRS, 3G and 4G, and its overall features and functioning are well known to those skilled in the field of mobile telecommunications.

In an aspect of the invention, the mobile device 3 comprises a power supply 302, which usually consists of a nickel metal-hydroxide (NiMH), lithium ion, and lithium polymer or similar battery, to power all functions of the phone.

The mobile device 3 further comprises a central processing unit (CPU) 301 configured to handle instructions of software, to process input and output signals, and to manage usage of the power supply 302. Instructions of software, as well as other types of instructions or data (e.g., communication protocols, identification information, images, audio, video, etcetera) are stored on at least one memory 303. The memory 303 can be ROM, RAM, EPROM, EEPROM, flash memory, or any combination thereof, or other memory usable and readable by the CPU 301.

The mobile device 3 further includes a GSM/GPRS/3G/4G module or unit 304 supporting wireless communications with a network and with other mobile devices through the BTS 2 as shown in FIG. 3, and a SIM/USIM 305 containing, among others, subscriber-related data. The mobile device 3 further includes a transmitter 307 and a receiver 308 connected to an antenna 309 for transmission and reception of signals from the BTS 2.

The mobile device 3 further comprises at least one speaker 310 to play audio signals, a microphone 311 to record audio signals, a display 312 which reflects the user's typing, displays text messages (e.g., SMS) or information about contacts, icons to applications, images and video, among other, displaying functions for the user.

The mobile device 3 further includes at least an input mechanism allowing the user to interact with the phone and its functions. The most common mechanism is a keypad 313. Nevertheless, most recent phones integrate touch screens which serve two purposes, namely as a screen and as input mechanism (keypad).

Figure 7:
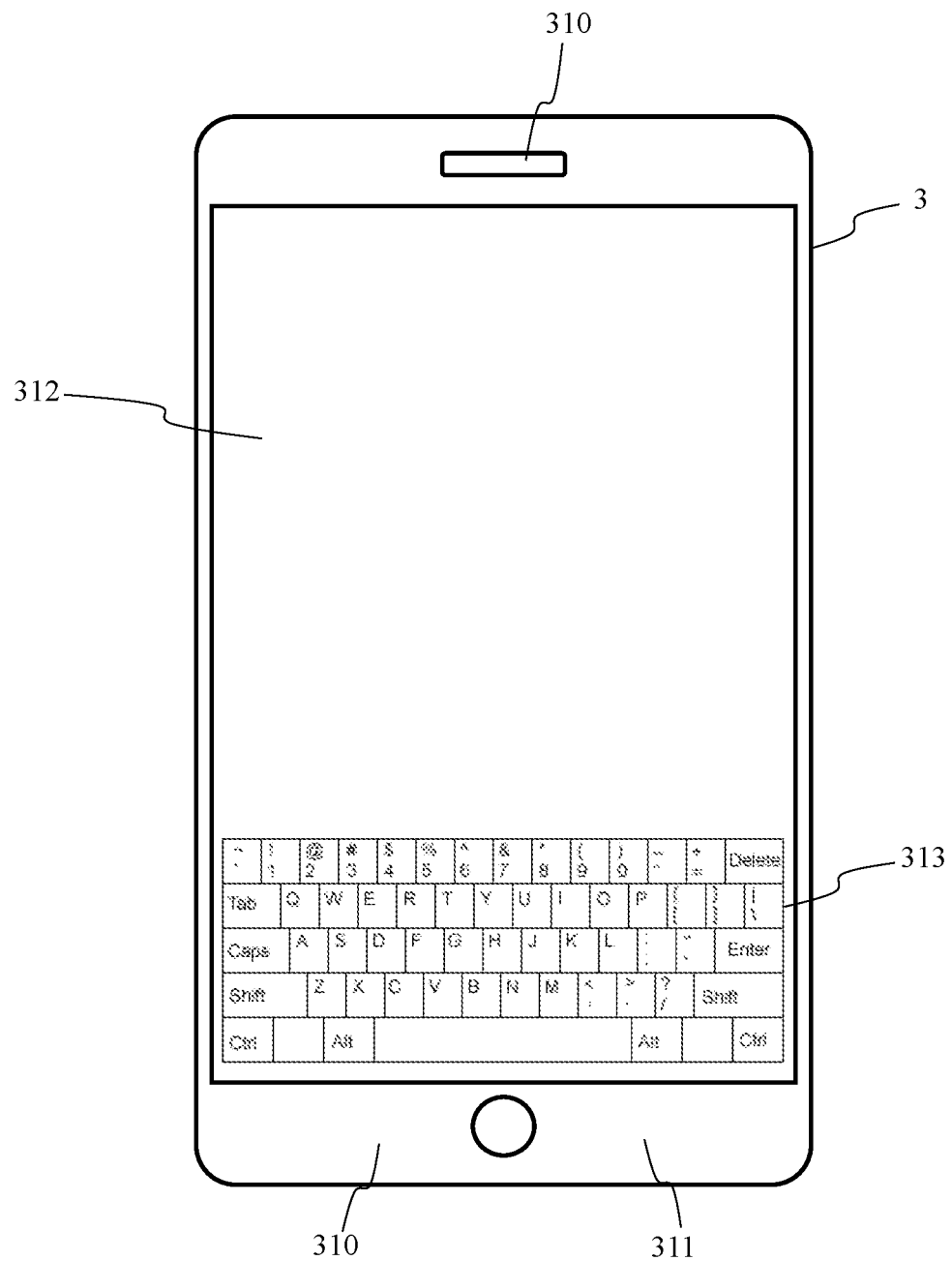
FIG. 7 is a simplified representation of a mobile device according to embodiments of the present invention.

With reference to FIG. 7, there is shown a simplified representation of the mobile device 3 having two separate or independent speakers 310, a microphone 311, and a display 312. The display 312, according to embodiments of the invention, consists in a touch screen showing the keypad 313 as well as icons and buttons to interact with the functions of the mobile phone, for example sending SMS messages.

As previously mentioned, the vehicle alarm system 1 is able to communicate with the mobile device 3 and vice versa by transmitting and receiving signals 4 through the BTS 2 (see FIG. 3) to remotely and wirelessly inform the mobile device 3 about the events that are detected by the vehicle alarm system 1, which usually trigger an alarm situation, while at the same time the vehicle alarm system 1 is able to activate a sound and/or luminous alarm in the vehicle, and it is also possible for the vehicle's owner to monitor and visualize information related to specific events that activated an alarm in the vehicle by means of the mobile device 3, and to take actions depending on the situation detected by the vehicle alarm system 1. For this purpose, the mobile device 3 is configured to receive information generated and transmitted by the vehicle alarm system 1 so that the vehicle's owner can visualize the specific event or events that activated the alarm in the vehicle, and it is also possible for the vehicle's owner to transmit information or commands to the vehicle alarm system 1 for several purposes, for instance to request a status report, to transmit a signal to activate or deactivate the alarm, to transmit an audio signal and/or image/video to be played/displayed in the vehicle, for example in the speaker 1111 and/or display 1114. These advantages and the exemplary functioning of the vehicle alarm system 1 together with the mobile device 3 according to embodiments of the invention as well as associated methods are described in greater detail below with reference to FIGS. 8 and 9.

Figure 8:
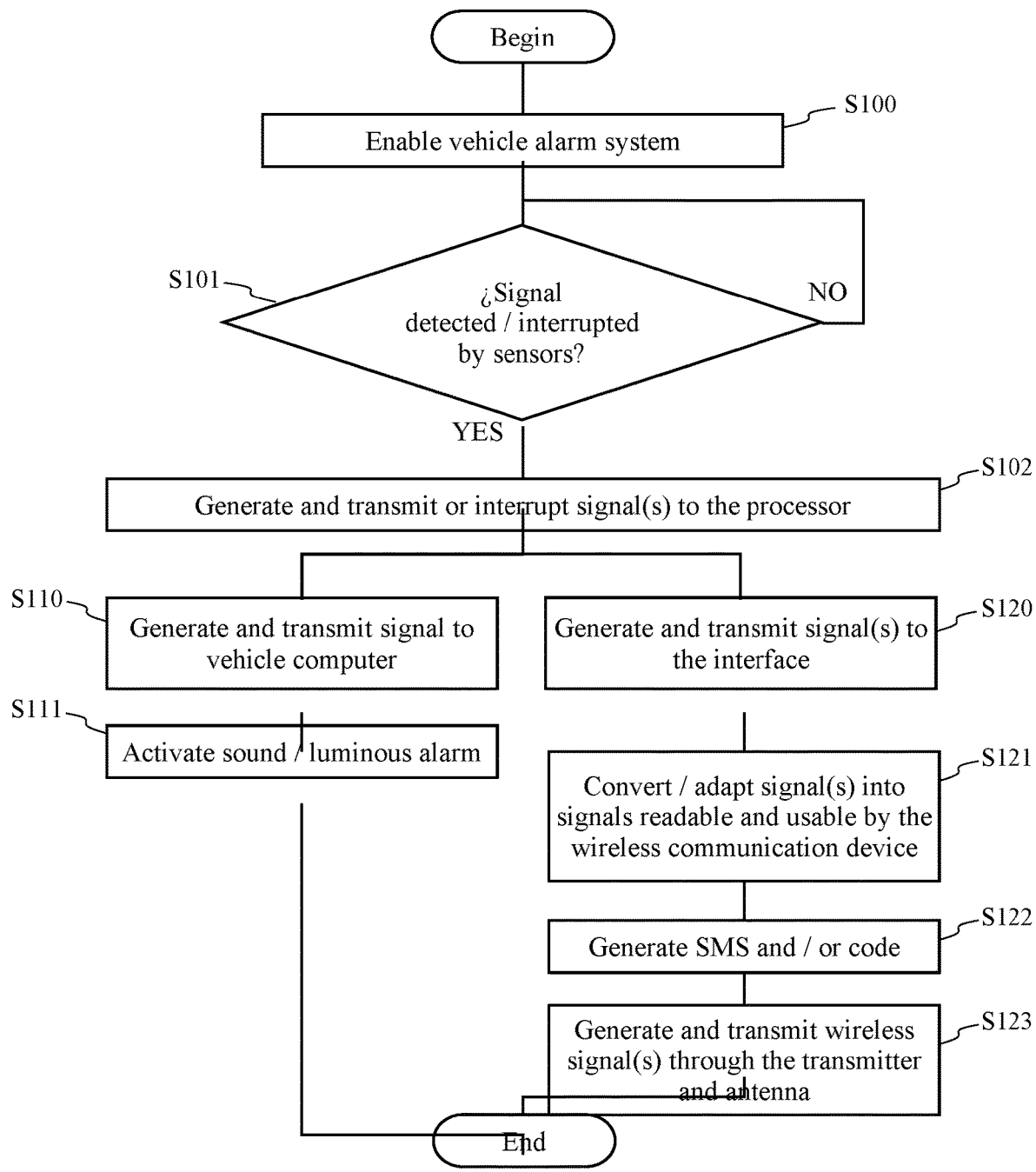
FIG. 8 is a flow chart of a method to detect alarm situations by means of a plurality of sensors and to inform said alarm situations to a mobile device of the vehicle's owner.

FIG. 8 shows a flow chart of a method, implemented in the vehicle alarm system 1, for detecting alarm events or situations by means of a plurality of sensors 1001-1006 installed in the vehicle 10 and triggering a sound and/or luminous alarm in the vehicle 10 and simultaneously informing the detection of such events to the mobile device 3 of the vehicle's owner through wireless signals 4.

The method of FIG. 8 begins with step S100 when the vehicle's owner enables the vehicle alarm system 1, for example by sending a signal from a remote control attached to or embedded in the vehicle's main key. Then, the method moves to step S101 in which one or more of the sensors 1001-1006 can detect one or more events of vibration, motion, rotation, opening, fracture and/or breakage, and upon detection, they generate and transmit or interrupt one or more signals to the processor 101 as explained above with reference to FIG. 4.

In a particular aspect of the invention, one or more of the sensors 1001, 1003 and 1005 are able to detect at least a signal related to a phenomenon of vibration and rotation, and they generate and transmit an electrical signal to the processor 101. Similarly, one or more of the sensors 1002 and 1006 are able to detect the opening of a door or the hood of the vehicle and they transmit or interrupt an electrical signal to the processor 101. The sensors 1004 are able to transmit or interrupt an electrical signal to the processor 101 if one or more of the windows of the vehicle suffered from a fracture or breakage.

When one or more of the sensors 1001-1006 detect an alarm situation such as vibration, opening, motion, rotation, fracture, breakage, they generate and transmit or interrupt an electrical signal to the processor 101 (step S102).

Then, on the one hand, the method moves to step S110 in which the processor 101 generates and transmits an electrical signal to the vehicle computer 1110 which in turn activates a sound and/or luminous alarm in the vehicle (step S111).

At the same time, or nearly at the same time of step S110, the processor 101 generates and transmits, on the other hand, an electrical signal or a plurality of electrical signals to the interface 104 (step S120). The signal(s) is (are) generated depending on which sensor or sensors detected an alarm event (vibration, motion, fracture, etc.) Then the interface 104, by means of the first signal conversion circuitry, converts or adapts such electrical signal(s) received from the processor 101 into signals, instructions and/or codes readable and usable by the wireless communication device 105 (step S121).

Subsequently, the method advances to step S122 in which the wireless communication device 105 generates one or more messages, particularly in the form of SMS and/or code(s), particularly in the form of data packets, to be transmitted to the mobile device 3 of the vehicle's owner.

For example, in an aspect of the invention, the wireless communication device 105 can generate a text message (SMS) including information that contains the indication of the alarm event detected by the sensors 1001-1006 and additional information such as time (date and hour), global position (GPS) coordinates in any valid format according to existing standards, e.g., latitude or longitude in DMS (Degrees, Minutes, Seconds), Universal Transverse Mercator coordinate system, etcetera, acquired from the GPS module 106.

Exemplary text messages that can be generated by the wireless communication device 105 according to embodiments of the present invention are listed, in a non-limitative manner, in Table 1 below.

TABLE 1

Exemplary messages generated by the wireless communication device of the vehicle alarm system, and transmitted to the mobile device of the vehicle's owner.

| Sensor | Event Detected | Date and Time | GPS Position | Message Generated and Sent |
|---|---|---|---|---|
| 1001 | vibration | DD/MM/YY-HH:MM | D°M'SS.SS" | Alarm: "Motion of vehicle" DD/MM/YY-HH:MM-D°M'SS.SS" |
| 1002 | opening | DD/MM/YY-HH:MM | D°M'SS.SS" | Alarm: "Opening of Door" DD/MM/YY-HH:MM-D°M'SS.SS" |
| 1003 | vibration | DD/MM/YY-HH:MM | D°M'SS.SS" | Alarm: "Impact" DD/MM/YY-HH:MM-D°M'SS.SS" |
| 1004 | fracture | DD/MM/YY-HH:MM | D°M'SS.SS" | Alarm: "Fracture on Window" DD/MM/YY-HH:MM-D°M'SS.SS" |
| 1004 | breakage | DD/MM/YY-HH:MM | D°M'SS.SS" | Alarm: "Breakage of Window" DD/MM/YY-HH:MM-D°M'SS.SS" |
| 1005 | rotation | DD/MM/YY-HH:MM | D°M'SS.SS" | Alarm: "Rotation of Wheels" DD/MM/YY-HH:MM-D°M'SS.SS" |
| 1005 | motion | DD/MM/YY-HH:MM | D°M'SS.SS" | Alarm: "Motion of Vehicle" DD/MM/YY-HH:MM-D°M'SS.SS" |
| 1006 | opening | DD/MM/YY-HH:MM | D°M'SS.SS" | Alarm: "Opening of Hood" DD/MM/YY-HH:MM-D°M'SS.SS" |

Alternatively or additionally, in step S122, in which the wireless communication device 105 generates messages in the form of SMS, the wireless communication device 105 can generate codes containing a string of characters; said string of characters includes signs, numbers and letters associated to the specific event detected by the sensors. For example, letter "V" is associated to the "vibration" event; letter "O" is associated to the "opening" event; letter "F" is associated to the "fracture" event; letter "B" is associated to the "breakage" event; letter "R" is associated to the "rotation" event; and letter "M" is associated to the "motion" event. The string of characters can also include data such as time (hour and date), as well as global positioning coordinates (e.g., DMS) acquired from the GPS module 106. These codes generated by the wireless communication device 105 according to embodiments of the present invention are exemplified, in a non-limitative manner, in Table 2 below.

TABLE 2

Exemplary codes that can be generated by the wireless communication device of the vehicle alarm system and transmitted to the mobile device of the vehicle's owner.

| Sensor | Event Detected | Date and Time | GPS Position | Code Generated |
|---|---|---|---|---|
| 1001 | vibration | DD/MM/YY-HH:MM | D°M'SS.SS" | 01-V-DD/MM/YY-HH:MM-D°M'S.SS" |
| 1002 | opening | DD/MM/YY-HH:MM | D°M'SS.SS" | 02-O-DD/MM/YY-HH:MM-D°M'S.SS" |
| 1003 | vibration | DD/MM/YY-HH:MM | D°M'SS.SS" | 03-O-DD/MM/YY-HH:MM-D°M'S.SS" |
| 1004 | fracture | DD/MM/YY-HH:MM | D°M'SS.SS" | 04-F-DD/MM/YY-HH:MM-D°M'S.SS" |
| 1004 | breakage | DD/MM/YY-HH:MM | D°M'SS.SS" | 04-B-DD/MM/YY-HH:MM-D°M'S.SS" |
| 1005 | rotation | DD/MM/YY-HH:MM | D°M'SS.SS" | 05-R-DD/MM/YY-HH:MM-D°M'S.SS" |
| 1005 | motion | DD/MM/YY-HH:MM | D°M'SS.SS" | 05-M-DD/MM/YY-HH:MM-D°M'S.SS" |
| 1006 | opening | DD/MM/YY-HH:MM | D°M'SS.SS" | 06-O-DD/MM/YY-HH:MM-D°M'S.SS" |

Further, the messages and/or codes generated by the wireless communication device 105 can also include additional data such as a measure of the duration of motion or rotation, intensity of vibration detected by the respective sensors, and intensity of force causing the fracture or breakage, GPS coordinates where a motion was detected first and GPS coordinates where motion finished, etcetera, depending on the capabilities of the sensors installed on the vehicle alarm system.

Once the wireless communication device 105 has generated the messages and/or codes from the signals received from the interface 104, the wireless communication device 105 generates and transmits, through the transmitter 109 and antenna 111, one or more wireless signals 4 to the BTS 2 (step S123). The wireless signals 4 can be generated and transmitted in the form of one or more SMS and/or data packets according to existing protocols in the GSM, GPRS, 3G, or 4G standards, similar or equivalent.

Figure 13:
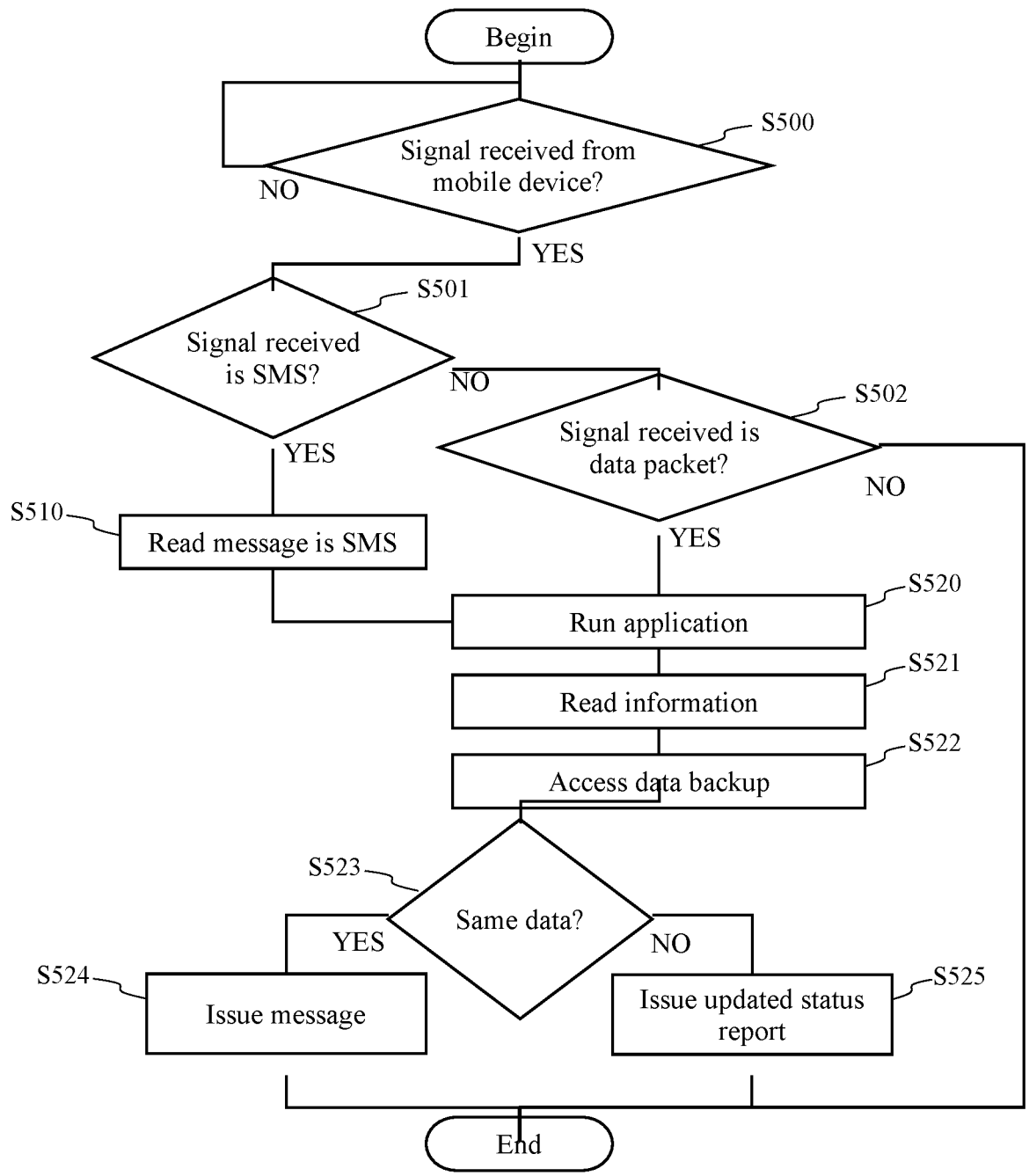
FIG. 13 is a flow chart of a method for receiving a status report request and issuing an updated status report that is sent to the mobile device of the vehicle's owner according to embodiments of the present invention.

Optionally, the wireless communication device 105 is also configured to store on the memory 113 a data backup containing all the signals received from the interface 104 in relation to the events detected by the sensors 1001-1006, as well as relevant information associated to those events such as date, hour, GPS position, etcetera, such that it is possible compare the information stored on the data backup with information received from an external device in a manner to be described below with reference to FIG. 13.

Subsequently, the BTS 2 forwards the signals 4 to the mobile device 3 of the vehicle's owner. Then the signals 4 are received in the mobile device 3 of the vehicle's owner and, finally, the mobile device 3 shows or displays an alert or notification informing the receipt of those signals 4, i.e., receipt of the SMS message or data packets, to the user.

In this way, the vehicle's owner or user is informed remotely about the occurrence of alarm events, and is provided with specific and accurate information about the events that triggered the alarm in the vehicle as well as information related to the date, time, duration, GPS position, and the like, about the moment that such events were detected by the vehicle alarm system 1. Then, the vehicle's owner is able to take actions based on this information, for example the vehicle's owner may get close to the vehicle to inspect it, or may generate and transmit a reply (for example, an SMS and/or data packet including images, sound, video) or an instruction to the vehicle alarm system, etcetera, as it will be described below with reference to FIG. 9.

Figure 9:
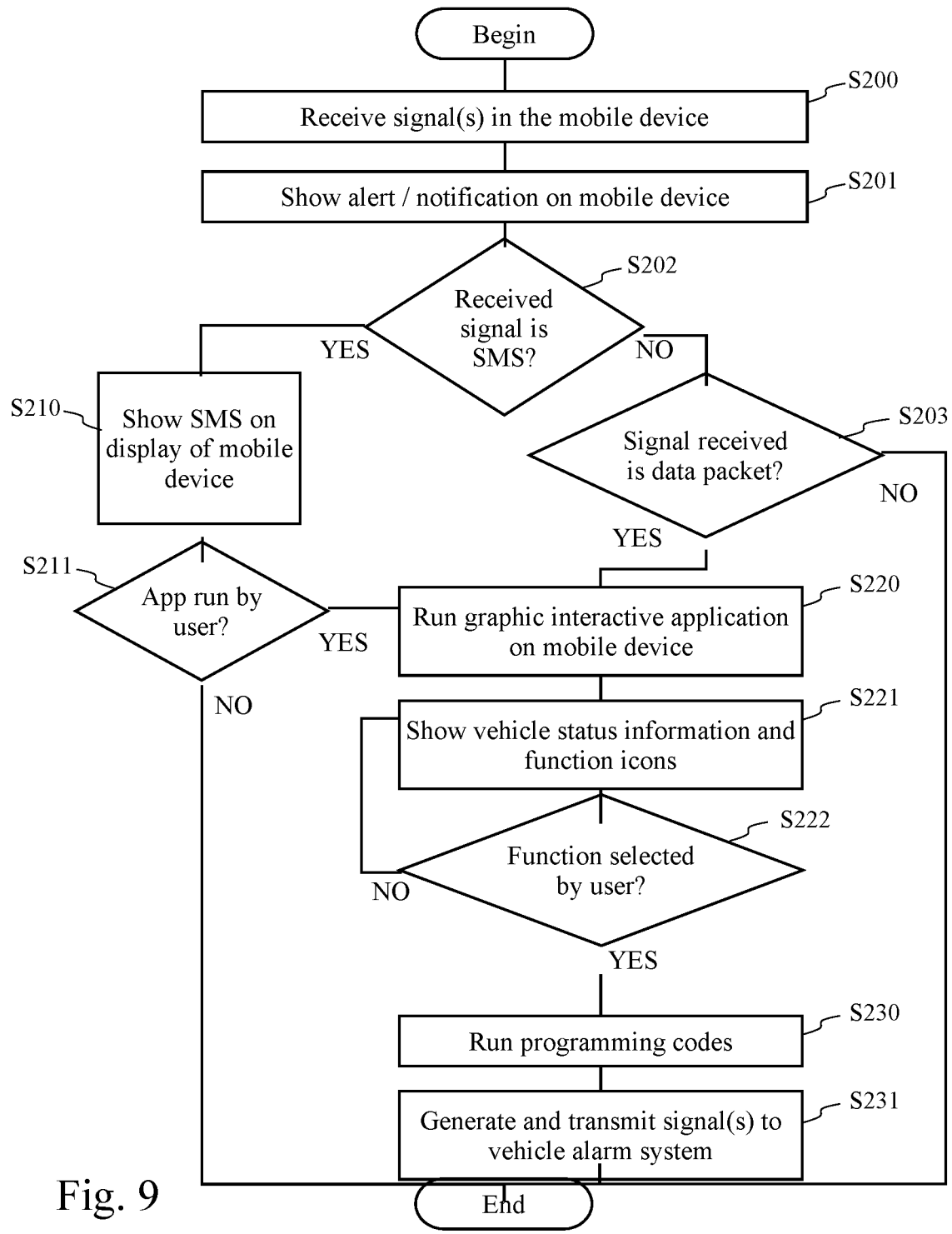
FIG. 9 is a flow chart of a method for displaying vehicle status information and alarm events on a mobile device and selecting functions after receiving signals from the vehicle alarm system.

Referring now to FIG. 9, there is shown a flow chart of a method, implemented in the user's mobile device 3 after receiving at least one signal 4 generated by the vehicle alarm system 1 according to embodiments of the present invention, for displaying vehicle status information and alarm events detected by the sensors 1001-1006 of the vehicle alarm system 1, and selecting functions or instructions to be transmitted and executed in the vehicle alarm system 1.

The method of FIG. 9 begins with step S200 in which the mobile device 3 receives at least one signal 4, which may consist of at least one SMS and/or data packet, which was generated and transmitted by the vehicle alarm system 1. Subsequently, the method moves to step S201 where the mobile device 3 shows or displays an alert or notification to the user indicating the receipt of the at least one signal 4.

Then, the method moves to step S202 to determine whether the received signal 4 is an SMS. If the signal 4 received is an SMS, the method advances to step S210 in which the contents of the SMS is displayed on the display 312 of the mobile device 3, in particular it shows the message generated in accordance with Table 1 above.

In step S210 the user is then informed with a text message about an alarm situation detected by the vehicle alarm system 1 and is also provided with specific information about the event that triggered the alarm in the vehicle, such as the date, hour, GPS position, etcetera, so that the user can take actions like inspecting the vehicle, notifying emergency services, or notifying insurance companies, etcetera.

Alternatively, in step S202, if the signal 4 received is not an SMS but a data packet (step S203), the method moves to step S220 in which the mobile device 3 can run a mobile application, commonly known as "app" that is installed and is executable on the mobile device 3 to display information related to the code generated and transmitted by the vehicle alarm system 1 in accordance with Table 2 above, i.e., the alarm situation informed by the vehicle alarm system, and also to provide a visual environment running on the mobile device 3 including functions selectable by the user. Said functions cause the mobile device 3 to generate and transmit signals to the vehicle alarm system 1, in a way to be described below with particular reference to FIGS. 9 and 10.

In the context of the present invention, a mobile application, mobile app, or simply "app", is a computer program designed to run on smartphones, tablets, and other similar mobile devices, which offers an interactive graphic platform to the user for playing games, receiving and sending e-mails, manage contacts or calendars, navigate through the Internet, GPS positioning and navigation, and the like.

The app according to embodiments of the present invention consists in a computer program running on the user's mobile device 3. This app allows the user to visualize the information provided by the vehicle alarm system 1, and also to generate and transmit information, in particular instructions executable by the vehicle alarm system 1. However, the wireless communication device 105 can also be configured in such a way that it includes an app installed thereon, which is similar to the app installed on the mobile phone 3 of the user, and is configured to receive and use the information contained in the signals received from an external mobile device, in particular the mobile device 3 of the vehicle's owner.

Figure 10:
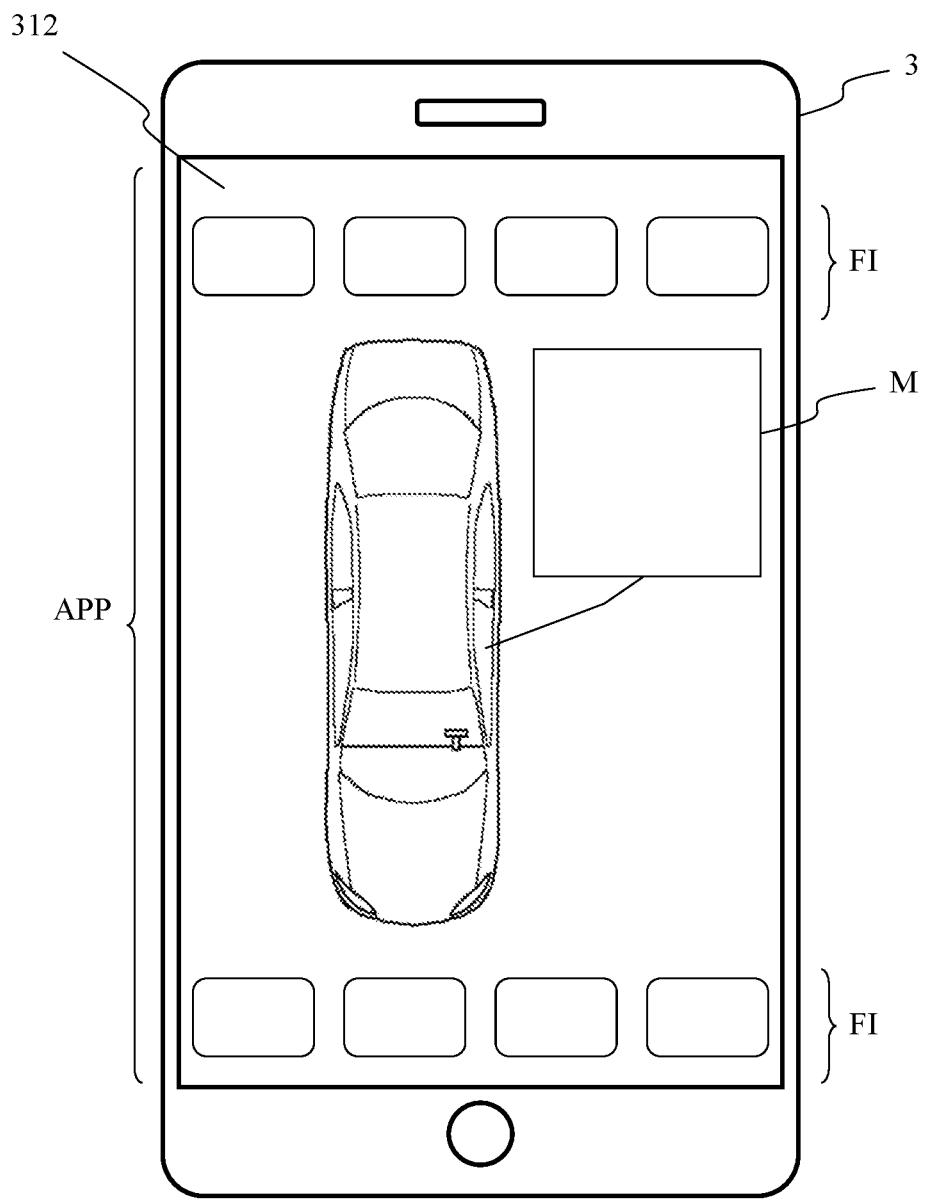
FIG. 10 is a simplified representation of a graphic interactive application running on a mobile device of the vehicle's owner according to embodiments of the present invention.

With reference now to FIG. 10, once the app is running in the foreground in the mobile device 3, or in other words the app is being displayed in the display 312 of the mobile device 3, the app shows a graphic interactive platform containing at least an image depicting the vehicle or some of the structural parts thereof, a plurality of boxes (M) including text and data related to the alarm situation informed by the vehicle alarm system 1, and function icons (FI) to execute instructions or commands, which the user can select depending on the information provided by the vehicle alarm system 1 (step S221 in the method of FIG. 9).

Firstly, the app according to embodiments of the invention is configured to use the codes provided by the vehicle alarm system and to generate a graphic representation of the information contained in those codes. For example, the app shows a message box (M) with the text related to the alarm situation detected by the vehicle alarm system, and an arrow linked to that specific event. In FIG. 10, there is shown in an exemplary way an event of "Breakage of a Window", which was detected by the sensor array 1004 and informed by the vehicle alarm system 1, and the app shows the message box with the information associated to that event. This exemplary alarm event is described in further detail in the Example below.

In this point, the vehicle's owner is now informed about an alarm situation detected by the vehicle alarm system and the vehicle's owner is in conditions to take actions, and possibly to generate and transmit instructions to the vehicle alarm system. To this end, as mentioned above, the app includes one or several function icons (FI) selectable by the user to generate and transmit instructions to the vehicle alarm system. For instance, the function icons include functions executable by the vehicle alarm system such as turning on/off a sound and/or luminous alarm, activating/deactivating one or more elements related to the vehicle's engine, turning off the vehicle's engine, playing a sound or video inside the vehicle, displaying an image in a screen of the vehicle, issuing a status report of the vehicle, issuing a current GPS position, starting a GPS tracking, activating anti-theft means installed on the vehicle, activating or deactivating door locks of the vehicle, activating/deactivating the air conditioner system, opening/closing windows, and also other kind of actions such as making a call to emergency numbers or insurance companies, and so on. These functions are intended to provide the vehicle's user with selectable actions as attempts to persuade vandals from causing damage to the vehicle or to threaten burglars, but also to request assistance from emergency services or insurance companies, and also to request updated information about the vehicle's status, for example in the absence of information provided by the vehicle alarm system, in particular after a determined period of time without receiving information from the vehicle alarm system.

In connection with the above, and returning to FIG. 9, when the user selects a function in the app (step S222), the app executes a subprogram or subset of instructions or program codes (step S230), and it generates and transmits one or more signals 4 to the vehicle alarm system 1 (step S231) through the BTS 2.

Continuing with FIG. 9, when the SMS is being or has been displayed on the mobile device 3 (step S210), the user may also initiate the app on the mobile device (step S211) and generate a function to be transmitted and executed by the vehicle alarm system 1; for example, the user may select a function of "Turn off Sound Alarm." To this end, the user may be required to click or tap on an icon associated in the app, which icon is displayed on the display 312 of the mobile device 3. When the app is running (step S220) and the vehicle status information is being displayed on the mobile device 3 (step S221), the user can select one or more functions provided by the function icons FI. In the aforementioned exemplary case, the user selects the function "TURNING OFF SOUND ALARM" by clicking or tapping on one of the function icons FI that is associated to that instruction (step S222). The app then executes a subprogram or subset of instructions or program codes (step S230) and generates and transmits a corresponding signal to the vehicle alarm system 1 (step S231). In this example, the signal can be in the form of an SMS and include a text message, for example the code "SOUND ALARM OFF". With this signal, the vehicle alarm system 1 will execute the instruction selected by the user on the app that runs on the mobile device 3 in a manner to be described below with reference to FIG. 11.

Accordingly, the app according to embodiments of the present invention consists of a computer readable medium that, when executed on the mobile device, generates an interactive graphic interface configured to: display information received from the vehicle alarm system; provide function icons selectable by the user; generate and transmit at least one instruction to the vehicle alarm system; wherein the at least one instruction comprises sending a vehicle's status report, sending information acquired from the input device, activating a sound and/or luminous alarm in the vehicle, deactivating a sound and/or luminous alarm in the vehicle.

Figure 11:
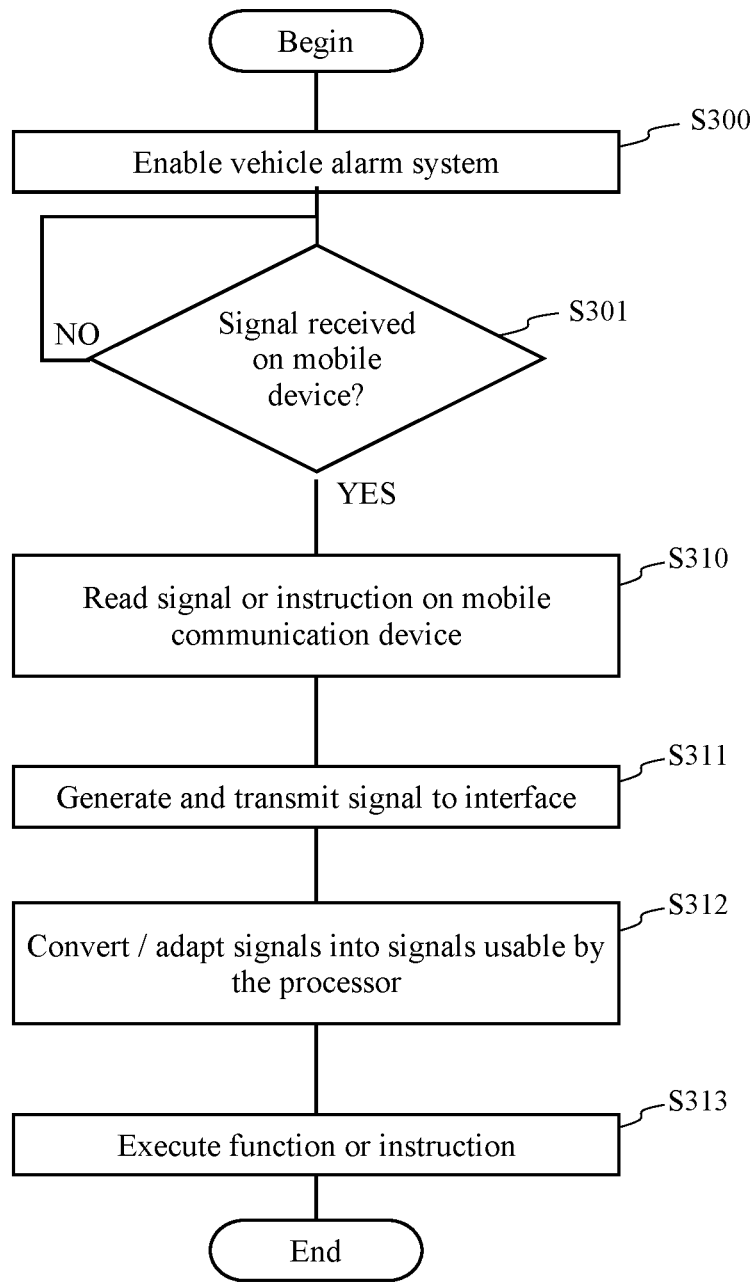
FIG. 11 is a flow chart of a method for receiving signals and executing instructions in the vehicle alarm system according to embodiments of the present invention.

With reference now to FIG. 11, there is shown a flow chart of a method for receiving and executing instructions in the vehicle alarm system 1, which instructions have been generated and transmitted by the mobile device 3 in the form of wireless signals 4, as depicted in FIG. 3. The method according to FIG. 11 begins with step S300 when the vehicle's owner enables the vehicle alarm system 1. The method then moves to step S301 to determine whether at least one signal 4 is received in the vehicle alarm system 1, in particular received by the wireless communication device 105 through the antenna 111 and receiver 110. After receiving at least one signal 4 in the vehicle alarm system 1, the wireless communication device 105 reads the signal or instruction contained in that signal by means of the GSM/GPRS/3G/4G module 107 (step S310). Responsive to this signal or instruction, the wireless communication device 105 generates and transmits at least one signal to the interface 104 (step S311) which in turn, by means of the second signal conversion circuitry, converts or adapts the signals received into signals, codes or instructions readable and usable by the processor 101 (step S312).

Subsequently, the processor 101 executes the function based on the signals, codes or instructions received from the interface 104 (step S313). In the exemplary case mentioned above, in which the user sends the instruction to turn off the sound alarm, the processor 101 generates and transmits a signal to the vehicle computer 1110 to turn the sound alarm off.

Alternatively, according to embodiments of the invention, the signal received in the wireless communication device 105 can include an instruction that is executed by the wireless communication device 105 itself, for example to enable taking images and/or video through the input device 114, wherein said images and/or video can be stored on the memory 113 and transmitted to the mobile device 3 through an SMS message and/or data packet.

In addition, the method can comprise a further step of generating and transmitting a signal to the mobile device 3 to inform the user about the execution of the instruction (following step S313). To this end, the processor 101 generates and transmits a signal to the interface 104; the interface 104 converts and adapts said signal into a signal readable and usable by the wireless communication device 105 which in turn generates a signal, in the form of an SMS or data packet, and transmits it to the mobile device 3. Then, the method according to FIG. 9 can be executed again. In this way, the user can be informed about the correct execution of the instructions transmitted to the vehicle alarm system 1.

Continuing with FIG. 11, when the method is in step S301, it is also possible to simultaneously execute the method for detecting and informing alarm events according to FIG. 8, such that either the reception of a signal from the mobile device 3 or the detection/interruption of a signal by the sensors 1001-1006 causes the vehicle alarm system 1 to generate and transmit signals to the mobile device 3.

Furthermore, it is also possible that the method according to FIG. 11 is executed even if the vehicle alarm system is not enabled, whereby the method starts with step S301. To this end, the vehicle alarm system 1 is further configured to inform the mobile device 3 about the situation that the vehicle alarm system 1 is not enabled, for instance with an SMS or data packet transmitted to the mobile device 3. The mobile device 3 receives the signal or data packet, and the user is informed about the situation that the vehicle alarm system is not enabled. In this connection, the app running on the mobile device 3 can include a function icon (FI) allowing the user to send an instruction, such as "ENABLE ALARM," to the vehicle alarm system 1. Accordingly, the user can select the function icon on the app such that it executes a subprogram or subset of programming codes to generate and transmit a signal to the vehicle alarm system 1. Subsequently, the wireless communication device 105 of the vehicle alarm system 1 receives the signal from the mobile device 3 through the BTS 2 and, through the interface 104, sends a signal to the processor 101 to enable the vehicle alarm system. In this way, the vehicle alarm system 1 can also be enabled or disabled by the vehicle's owner by sending a signal from the mobile device 3, alternatively or in addition to the transmission of a signal from the remote control that is embedded or associated to the main key of the vehicle.

The app according to embodiments of the invention is further configured to inform the user about the situation that no information has been received from the vehicle alarm system 1, for example after a predetermined period of time. To this end, the app running on the mobile device 3 also includes a function allowing the user to request and visualize updated status information from the vehicle alarm system 1.

As mentioned above, the app according to embodiments of the invention displays vehicle's status information provided by the vehicle alarm system 1. However, there may be certain circumstances under which the mobile device 3 does not receive signals transmitted by the vehicle alarm system 1 or under which the vehicle alarm system 1 does not transmit signals to the mobile device 3 even if the vehicle alarm system is enabled. To solve these deficiencies, the app according to embodiments of the present invention is configured to store a data backup containing all the previous reports received from the vehicle alarm system and is also configured to compare the current date and hour with the date and hour of the last status report received from the vehicle alarm system, such that if a predetermined period of time has passed since the last status report, the app allows the user to generate and transmit an updated status request to the vehicle alarm system. Responsive to said updated status request, the vehicle alarm system generates and transmits an updated report to the mobile device of the vehicle's owner. This method is described in further detail below with reference to FIG. 12.

Figure 12:
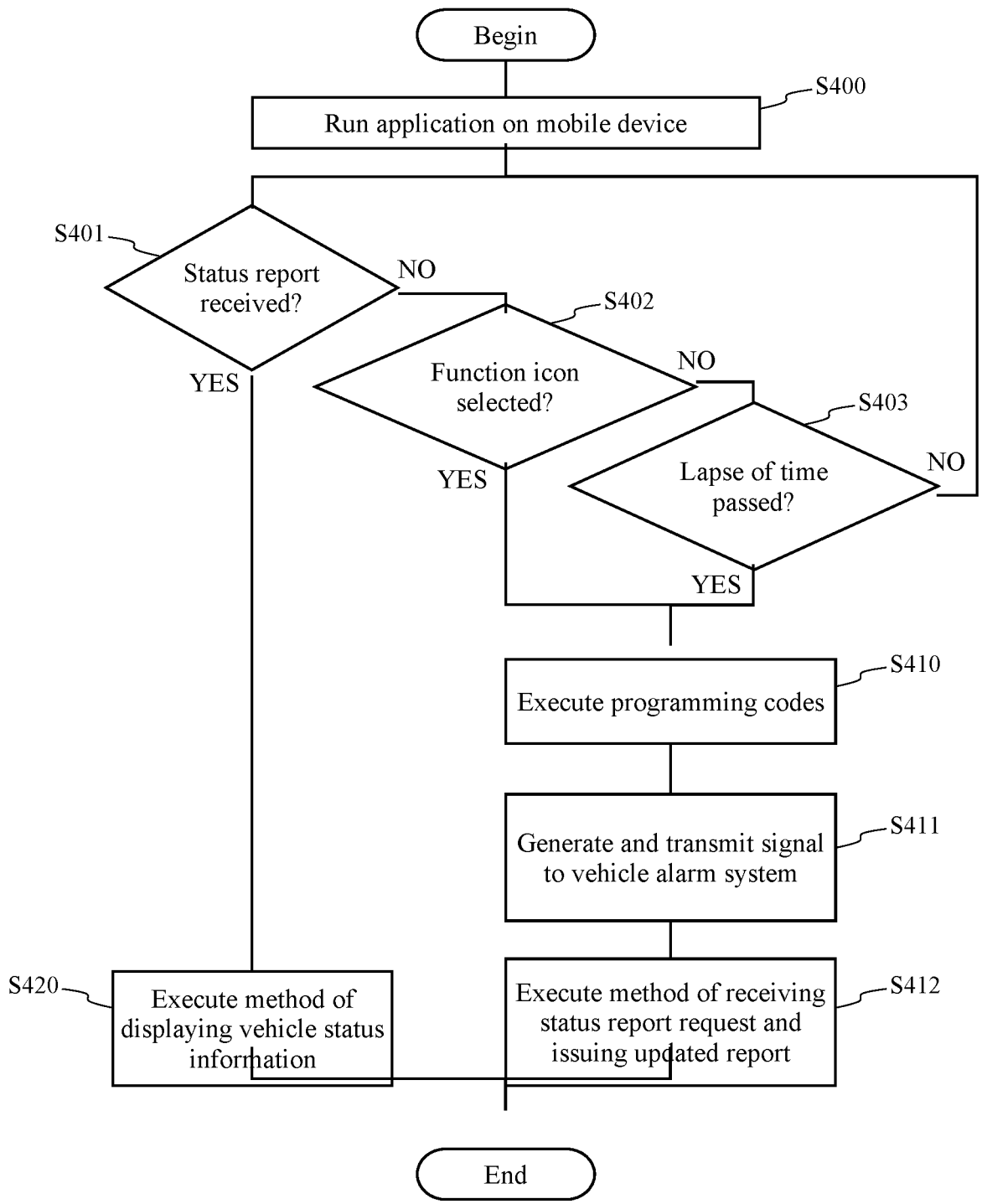
FIG. 12 is a flow chart of a method for requesting updated vehicle status information to the vehicle alarm system according to embodiments of the present invention.

FIG. 12 shows a method, executed at least partially on the mobile device 3 of the vehicle's owner or user, for requesting vehicle's updated status information from the vehicle alarm system 1. The method begins with step S400 in which the user runs the app on the mobile device 3. The app includes a function icon FI allowing the user to visualize status reports received from the vehicle alarm system, for example selectable from a list of events; all the status reports are retrieved from the memory 303 of the mobile device 3. Then, the method moves to step S401 to determine whether a status report has been received on the mobile device 3. On a condition that a status report has been received, from the vehicle alarm system, the method moves to step S420, in which the method of displaying vehicle status information is executed. On a condition that no status report has been received from the vehicle alarm system, the method moves to step S402 to determine whether the user selects a function icon FI such as, for example "REQUESTING UPDATED STATUS REPORT". On a condition that the user does not select any function icon FI on the app, the method moves to step S403 to determine whether a predetermined period of time has passed since the last status report received from the vehicle alarm system 1. On a condition that the predetermined period of time has not passed, the method returns to step S401 until one of the steps S401, S402 or S403 is true. In particular, either when the user selects a function on the app or when a predetermined period of time has passed since the last status report, the method moves to step S410 in which the app executes a subprogram or subset of instructions or programming codes to generate and transmit, in step S411, a signal 4 to the vehicle alarm system 1. Said signal 4 includes a message like "STATUS REQUEST" as well as information about the last event stored on the memory 303, for example information like message/code, date and time of the last event received in the mobile device 3. Here, the term "message/code" refers to the "message" or "code" generated by the wireless communication device 105 in accordance with Table 1 or Table 2 respectively.

In connection with the above, the signal 4 is generated in the form of a SMS message and/or data packet, and is transmitted to the vehicle alarm system 1 through the BTS 2 (see FIG. 3). The signal 4 is received by the wireless communication device 105 through the antenna 111 and receiver 110. Then, the method moves to step S412 in which the method according to FIG. 13 is carried out, as it is described below.

With reference now to FIG. 13, there is shown a flow chart of a method implemented in the vehicle alarm system 1 for receiving a status report request and issuing a status report to the mobile device 3. The method begins with step S500 to determine whether the wireless communication device 105 has received a signal from an external device, in particular from the mobile device 3 of the vehicle's owner. In the affirmative case, the method moves to step S501 to determine whether the received signal is an SMS. On a condition that the received signal is an SMS, the method moves to step S510, otherwise the method moves to step S502 to determine whether the received signal is a data packet.

In step S510 the wireless communication device 105 reads the information contained in the SMS; in this exemplary case, it reads the message "STATUS REQUEST", and it is interpreted by the wireless communication device 105 as an instruction to run automatically the app on the wireless communication device 105.

In step S502, on a condition that the received signal is a data packet, the method moves to step S520 to run automatically the app on the wireless communication device 105.

Accordingly, either by receiving an SMS message or a data packet from the mobile device 3 with the status request, the wireless communication device 105 runs the app installed thereon to read, in step S521, the information related to the last event stored on the mobile device 3, in particular the message/code, date and time of the last event retrieved from the memory 303 of the mobile device 3.

As previously mentioned, the wireless communication device 105 is configured to store a data backup of all signals received from the interface 104 such that, after receiving the status request signal and reading the information contained therein, the wireless communication device 105 accesses, in step S522, the data backup stored on the memory 113.

Subsequently, the method moves to step S523 to determine whether the information stored on the memory 113, in particular on the data backup, coincides with the information received from the mobile device 3 by comparing the message/code, date and time of the last event stored on the data backup with the message/code, date and time received from the mobile device 3; in particular, the app executes a subprogram or subset of instructions or program codes to determine whether the information about the last message/code, date and time stored on the wireless communication device 105 coincides with the message/code, date and time of the last event stored on the mobile device 3. In the affirmative case, the method moves to step S524 in which the wireless communication device 105 generates and transmits a signal to the mobile device 3 informing that the last event stored on the mobile device 3 has already been reported, which means that the information on the mobile device 3 is updated. Said signal can be issued as a message to the mobile device 3, for example in the form of a new SMS message or a data packet, which is read and displayed on the mobile device 3 as previously described with reference to the flow chart shown in FIG. 9.

On the contrary, if the information about the last message/code, date and time stored on the wireless communication device 105 does not coincide with the information about the message/code, date and time of the last event stored on the mobile device 3, the method moves to step S525 in which the wireless communication device 105 generates and transmits one or more signals to the mobile device 3 with the information about the event or events that have not been received on the mobile device 3, namely all the events since the last event stored on the mobile device 3 to the last event stored on the vehicle alarm system 1. In this way, the information on the mobile device 3 is updated and the method for displaying vehicle status information according to FIG. 9 can be carried out in the mobile device 3. Consequently, the vehicle alarm system 1 and the mobile device 3 are able to update the information about the vehicle's status, in particular after the user transmits an updated status request signal to the vehicle alarm system 1.

Example

An alarm situation is detected by the vehicle alarm system 1 and informed to the mobile device 3 of the vehicle's owner in the following manner: at least one of the sensors 1002 detects the breakage of a window of the vehicle, and a signal is generated and transmitted to the processor 101, which in turn generates and transmits a signal to the interface 104. The interface 104 converts or adapts the signal received into a signal readable and usable by the wireless communication device 105, which then generates a code including a string of characters as shown, for example in Table 2 above. For this exemplary event, the wireless communication device 105 generates a code 02-O-DD/MM/YY-HH:MM-D° M' SS.SS" which is then transmitted as a data packet (wireless signal 4) through the transmitter 109 and antenna 111 to the BTS 2. The BTS 2 then forwards the data packet to the mobile device 3 of the vehicle's owner, and the method according to FIG. 9 is carried out, in which the information is displayed on the app that is installed on the mobile device 3 of the vehicle's owner.

Once the information is received in the mobile device 3, the vehicle's owner can select a function icon of the app to activate a sound alarm in the vehicle and, in addition, start capturing for example video images by means of the input device 114. To this end, the vehicle's owner selects a function icon FI in the app to activate the alarm in the vehicle and selects other function icon FI to commence capturing images/video in the vehicle. The app generates and transmits the instructions to the alarm system 1, which in turn executes the instructions received by following the steps depicted in the method of FIG. 11.

It will be appreciated by those skilled in the art that many improvements and new technologies in the field of telecommunications and electronics will be developed during the life of a patent deriving from this application. Accordingly, the present description is intended to include all terms and their scope corresponding to such improvements and new technologies.

It is to be understood that certain features of the invention which are, for the sake of clarity, described in the context of separate embodiments, may also be provided in combination in a single embodiment. Conversely, various features of the invention which are, for the sake of brevity, described in the context of a single embodiment, may also be provided separately or in any suitable sub-combination or as suitable in any other embodiment of the invention. Certain elements described in the context of various embodiments are not to be considered essential features of those embodiments, unless the embodiment does not work without those elements.

Although the invention has been described in conjunction with specific embodiments and schematic diagrams thereof, it is evident that many alternatives, modifications and variations will be apparent to those skilled in the art, and those alternatives, modifications and variations fall within the spirit and scope of the appended claims.

LIST OF REFERENCE NUMBERS

1 Vehicle alarm system
1a Vehicle alarm system of the prior art
10, 10a Vehicle
101, 101a Processor
102 Power Supply
103 Memory
104 Interface
105 Wireless communication device
106 GPS module
107 GSM/GPRS/3G/4G module
108 SIM/USIM
109 Transmitter
110 Receiver
111 Antenna
112 Power supply
113 Memory
114 Input device
1001 Vibration sensors
1002 Door sensors
1003 Chassis sensors
1004 Window sensors
1005 Wheel sensors
1006 Hood sensors
1110 Vehicle computer
1111 Speaker
1112 Horn
1113 Lights
1114 Display
2 Base Transceiver Station (BTS)
3 Mobile device of the vehicle's owner or user
301 Central processing unit
302 Power supply
303 Memory
304 GSM/GPRS/3G/4G module
305 SIM/USIM
306 GPS module
307 Transmitter
308 Receiver
309 Antenna 310 Speaker
311 Microphone
312 Display
313 Keypad
4 Wireless signal
APP App running on the mobile device
FI Function icons selectable by user
M Message box

The invention claimed is:

1. A vehicle alarm system implemented in a vehicle, comprising:
    a plurality of sensors configured to detect, independently from each other, at least one of a vibration signal, an opening signal, a motion signal, a fracture signal and a breakage signal, of at least one component of the vehicle;
    a processor configured to communicate with the plurality of sensors; and
    a wireless communication device configured to communicate with the processor through an interface;
    wherein the interface is configured to generate, by means of a first signal conversion circuitry, at least one wireless communication device-readable and usable signal based on at least one processor signal, and the interface is configured to generate, by means of a second signal conversion circuitry, at least one processor-readable and usable signal based on at least one wireless communication device signal,
    wherein the vehicle alarm system is configured to transmit at least one information containing wireless signal related to the at least one vibration signal opening signal, motion signal, fracture signal and breakage signal detected by the plurality of sensors to a mobile device, and the vehicle alarm system is configured to transmit to a vehicle computer a sound and/or luminous alarm activating signal,
    wherein the vehicle alarm system is configured to receive at least one mobile device wireless signal, and
    wherein the at least one mobile device wireless signal includes functions executable by the vehicle alarm system.

2. The vehicle alarm system according to claim 1, wherein the vehicle alarm system further comprises:
    a power supply and a memory configured to communicate with the processor.

3. The vehicle alarm system according to claim 1, wherein the vehicle alarm system further comprises:
    a power supply, a memory and an input device configured to communicate with the wireless communication device.

4. The vehicle alarm system according to claim 3, wherein the input device is configured to capture images and/or video that can be stored on the memory.

5. The vehicle alarm system according to claim 3, wherein the wireless communication device further comprising at least one of:
    a GPS module,
    a GSM/GPRS/3G/4G module,
    a SIM/USIM,
    a transmitter,
    a receiver, and
    an antenna.

6. The vehicle alarm system according to claim 3, wherein the at least one wireless communication device-readable and usable signal is stored on the memory.

7. The vehicle alarm system according to claim 1, wherein the at least one information containing wireless signal further includes information acquired from a GPS module.

8. The vehicle alarm system according to claim 1, wherein the at least one information containing wireless signal is transmitted in the form of at least one SMS message and/or a data packet.

9. The vehicle alarm system according to claim 1, wherein said functions executable by the vehicle alarm system comprise:
    turning on or off a sound and/or luminous alarm in the vehicle,
    activating or deactivating one or more elements related to an engine of vehicle,
    turning off the engine of the vehicle,
    playing a sound or video inside the vehicle,
    displaying an image in a screen of the vehicle,
    issuing a status report of the vehicle to the mobile device,
    issuing a current GPS position of the vehicle to the mobile device,
    starting a GPS tracking of the vehicle,
    activating anti-theft means installed on the vehicle,
    activating or deactivating door locks of the vehicle,
    activating or deactivating an air conditioner system of the vehicle, and opening or closing windows of the vehicle.

10. A method, implemented in a vehicle alarm system, to monitor and inform a status of a vehicle, the method comprising:
    detecting independently from each other, by means of a plurality of sensors, at least one of a vibration signal, an opening signal, a motion signal, a fracture and a breakage signal, of at least one component of the vehicle;
    transmitting or interrupting an electrical signal to a processor based on the at least one vibration signal, opening signal, motion signal, fracture signal and breakage signal detected by the plurality of sensors;
    transmitting at least one processor signal to an interface which is configured to communicate with the processor and a wireless communication device;
    generating, by means of a first signal conversion circuitry of the interface, at least one wireless communication device-readable and usable signal on the basis of the at least one processor signal;
    transmitting to the wireless communication device the at least one wireless communication device-readable and usable signal generated by the first signal conversion circuitry of the interface;
    transmitting, through a transmitter and an antenna which are configured to communicate with the wireless communication device, at least one information containing wireless signal related to the at least one vibration signal, opening signal, motion signal, fracture signal and breakage signal detected by the plurality of sensors to a mobile device, and transmitting, through the processor, to a vehicle computer a sound and/or luminous alarm activating signal;
    receiving at least one mobile device wireless signal, wherein said at least one mobile device wireless signal includes functions executable by the vehicle alarm system; and
    generating, by means of a second signal conversion circuitry of the interface, at least one processor-readable and usable signal on the basis of at least one wireless communication device signal.

11. The method according to claim 10, wherein
the at least one information containing wireless signal further includes information acquired from a GPS module.

12. The method according to claim 10, wherein
the at least one information containing wireless signal further includes information obtained from an input device.

13. The method according to claim 12, wherein said information containing wireless signal comprises images and/or video.

14. The method according to claim 10, wherein the method further comprising:
storing the at least one wireless communication device-readable and usable signal on a memory.

15. The method according to claim 10, wherein said functions executable by the vehicle alarm system comprise:
turning on or off a sound and/or luminous alarm in the vehicle,
activating or deactivating one or more elements related to an engine of vehicle,
turning off the engine of the vehicle,
playing a sound or vide inside the vehicle,
displaying an image in a screen of the vehicle,
issuing a status report of the vehicle to the mobile device,
issuing a current GPS position of the vehicle to the mobile device,
starting a GPS tracking of the vehicle,
activating anti-theft means installed on the vehicle,
activating or deactivating door locks of the vehicle,
activating or deactivating an air conditioner system of the vehicle, and
opening or closing windows of the vehicle.

16. A method to monitor a status of a vehicle with a vehicle alarm system,
the method comprising:
receiving at least one information containing wireless signal related to at least one of a vibration signal, an opening signal, a motion signal, a fracture signal and a breakage signal detected independently from each other;
displaying said information containing wireless signal received from the vehicle alarm system on a display of the mobile device;
generating at least one mobile device wireless signal including functions executable by the vehicle alarm system; and
transmitting said at least one mobile device wireless signal to the vehicle alarm system.

17. The method according to claim 16, further comprising
providing a graphic interactive application, through which said information containing wireless signal received from the vehicle alarm system is displayed on the display.

18. The method according to claim 17, further comprising
displaying on the graphic interactive application a plurality of function icons selectable by a user.

19. A method to generate a graphic interactive interface, comprising:
receiving at least one information containing wireless signal from a vehicle alarm system;
displaying, by a mobile device, the at least one information containing wireless signal related to at least one vibration signal, opening signal, motion signal, fracture signal and breakage signal detected independently from each other by a plurality of sensors of the vehicle alarm system;
providing a plurality of function icons selectable by a user of the mobile device; and
generating and transmitting at least one mobile device wireless signal to the vehicle alarm system on the basis of the selection of at least one of the plurality of function icons, wherein said at least one mobile device wireless signal includes functions executable by the vehicle alarm system.

\* \* \* \* \*